United States Patent [19]

Mueller et al.

[11] Patent Number: 5,235,509
[45] Date of Patent: Aug. 10, 1993

[54] CUSTOMER SELF-ORDERING SYSTEM USING INFORMATION DISPLAYED ON A SCREEN

[75] Inventors: Raymond J. Mueller, Littleton; Christopher K. Neimeister, Golden; John R. Counter, Boulder; Michael P. Marcus, Lakewood, all of Colo.

[73] Assignee: Management Information Support, Inc., Lakewood, Colo.

[21] Appl. No.: 436,605

[22] Filed: Nov. 15, 1989

Related U.S. Application Data

[63] Continuation-in-part of Ser. No. 373,381, Jun. 28, 1989, abandoned.

[51] Int. Cl.$^5$ .................. G06F 15/24; G06F 15/44
[52] U.S. Cl. ..................... 364/405; 364/401; 395/156; 395/157; 340/706
[58] Field of Search ........... 364/401, 405, 406, 709.03, 364/709.04; 340/706; 395/156, 157, 118

[56] References Cited

U.S. PATENT DOCUMENTS

| | | | |
|---|---|---|---|
| 3,237,198 | 2/1966 | Slutsky | 346/17 |
| 3,304,416 | 2/1967 | Wolf | 377/13 |
| 3,445,633 | 5/1969 | Ratner | 235/381 |
| 3,622,995 | 11/1971 | Dilks et al. | 235/382 |
| 3,786,421 | 1/1974 | Wostl et al. | 235/381 |
| 3,826,344 | 7/1974 | Wahlberg | 194/206 |
| 3,931,497 | 1/1976 | Gentile et al. | 235/381 |
| 4,073,368 | 2/1978 | Mustapick | 186/53 X |
| 4,128,757 | 12/1978 | Garner, Jr. | 235/383 |
| 4,169,521 | 10/1979 | Vayda, Jr. | 186/36 X |
| 4,247,759 | 1/1981 | Yuris et al. | 235/381 |
| 4,300,040 | 11/1981 | Gould et al. | 235/381 |
| 4,388,689 | 6/1983 | Hayman et al. | 364/401 |
| 4,415,065 | 11/1983 | Sandstedt | 186/39 |
| 4,449,186 | 5/1984 | Kelly et al. | 364/407 |
| 4,530,067 | 7/1985 | Dorr | 364/900 |

(List continued on next page.)

FOREIGN PATENT DOCUMENTS 62-5470 1/1987 Japan .

OTHER PUBLICATIONS

Compose (ver. 2.0) software program, Compose, Inc., Virginia Beach, Va., Jan., 1988.
Rest Systems software program, article from Dialog File: PTS New Products Announcements/Plus, Jun. 26, 1986.

(List continued on next page.)

Primary Examiner—Roy N. Envall, Jr.
Assistant Examiner—A. Bodendorf
Attorney, Agent, or Firm—Sheridan, Ross & McIntosh

[57] ABSTRACT

Method and apparatus are disclosed for facilitating self-ordering of items, particularly in a fast food environment. The apparatus includes a customer terminal having a display screen that is preferably a touch screen used by the customer during the self-ordering operation. The screen displays information that assists the customer in becoming acquainted with the self-ordering process. Subsequent screens display information relating to the selection of food items. Indicia on the display screen represents food items for selection. Such food items are arranged according to food categories. In accordance with one display, indicia representing primary category food items, such as sandwiches, are shown on the screen. One or more of such food items can be selected by the customer using the displayed indicia, such as by touching the screen. This same display includes indicia representing a number of menus for secondary food items, such as salads, desserts and drinks. Touching of indicia representing a particular menu causes another display screen to be shown that illustrates predetermined food items associated with that particular menu. The display screen with the primary category food items also preferably includes further indicia. The selection of such indicia by the customer initiates the occurrence of other predetermined functions, such as cancellation of a previously selected item or an indication that the ordering of food items has been finished. Another screen displays a request as to whether or not the customer wishes to dine in or take out the ordered food items.

5 Claims, 28 Drawing Sheets

U.S. PATENT DOCUMENTS

| | | | |
|---|---|---|---|
| 4,547,851 | 10/1985 | Kurland | 364/401 |
| 4,553,222 | 11/1985 | Kurland et al. | 364/900 |
| 4,567,359 | 1/1986 | Lockwood | 235/381 |
| 4,569,421 | 2/1986 | Sandstedt | 186/39 |
| 4,582,172 | 4/1986 | Takeuchi et al. | 186/38 |
| 4,593,183 | 6/1986 | Fukatsu | 235/379 |
| 4,638,312 | 1/1987 | Quinn et al. | 340/825.35 |
| 4,648,062 | 3/1987 | Johnson et al. | 364/900 |
| 4,675,515 | 6/1987 | Lucero | 235/381 |
| 4,722,053 | 1/1988 | Dubno et al. | 364/401 |
| 4,775,935 | 10/1988 | Yourick | 364/401 |
| 4,797,818 | 1/1989 | Cotter | 364/401 |
| 4,837,693 | 6/1989 | Schotz | 364/408 |
| 4,858,743 | 8/1989 | Paraskevakos et al. | 194/205 |
| 4,882,475 | 11/1989 | Miller et al. | 235/383 |
| 4,899,276 | 2/1990 | Stadler | 340/721 |
| 4,982,346 | 1/1991 | Girovard et al. | 364/550 |
| 5,077,607 | 12/1991 | Johnson et al. | 358/86 |

OTHER PUBLICATIONS

"Touch screen interactive restaurant POS system", (description of Dataranger software program) article from Dialog File: PTS New Products Announcements/Plus, Apr. 28, 1986.

"Two cheeseburgers and a coke to go, please" Data Trends Publications, Inc. May 23, 1990 Vol. 7, No. 21.

"IBM develops touchscreen order system for fast food" Food Technology Oct. 1990, p. 48.

"The byte stuff 1989" Restaurants & Institutions, vol. 99, pp. 135–136 Aug. 21, 1989.

"The byte stuff 1990" Restaurant & Institutions, vol. 100, pp. 135–138 May 2, 1990.

| | SCREEN #11 | ORDER NUMBER 153 |
|---|---|---|
| PAID | | |

TOUCH FOR ITEMS ABOVE

| | |
|---|---|
| SM. DIET COLA | 0.79 |
| K. MEAL/CH. BURGER | 1.59 |
| SMALL COLA | 0.79 |
| TURKEY SANDWICH | 1.89 |
| DBL. CHEESEBURGER | 1.79 |

| | |
|---|---|
| TOTAL W/TAX | 7.32 |
| AMT. TENDERED | 8.00 |
| CHANGE DUE | 0.68 |

TOUCH FOR ITEMS BELOW

CASHING OUT AN ORDER

| AMOUNT RECEIVED | PRINT A RECEIPT |
|---|---|
| PREVIOUS ORDER | NEXT ORDER |

CHANGE/ENTER AN ORDER

| CHANGE A CURRENT ORDER | ENTER A NEW ORDER |
|---|---|
| START/END SHIFT OVERRING/VOID | MANAGER SCREEN |

DISCOUNTS

- ENTER COUPON NUMBER
- ENTER DOLLAR DISCOUNT
- ENTER PERCENT DISCOUNT

HELP

FIG. 8

CUSTOMER SELF-ORDERING SYSTEM USING INFORMATION DISPLAYED ON A SCREEN

CROSS REFERENCE TO RELATED APPLICATION

This application is a continuation-in-part application of U.S. patent application Ser. No. 07/373,381 filed on Jun. 28, 1989 now abandoned.

BACKGROUND OF THE INVENTION

1. Field of The Invention

The present invention relates to a method and a system capable of accepting and processing customer input retail orders. More specifically, the present invention relates to a point of sale system and operating method therefor which reduces labor costs and general overhead while enhancing or improving customer service.

2. Description of The Related Art

Retail stores, such as fast food restaurants and the like, have traditionally been labor intensive industries. Employees of retail establishments have traditionally been paid at or near the minimum wage. Since chances for advancement are minimal, such stores have found it difficult to retain quality employees, and the employee turnover rate is very high. Further, given that the employees handle virtually all of the receipts and products at some point in time during the day-to-day operations of such stores, and managers cannot watch all of the employees all of the time, employee theft is a very serious problem.

Additionally, managing retail stores can be quite complicated. Sales projections must be made, labor requirements estimated, employees scheduled for work, products ordered and kept on hand in sufficient quantities, receipts counted, sales reports prepared, daily, weekly and monthly activity reports prepared, etc. To date, many of these actions and decisions associated therewith are made based on estimates or intuition. Wrong decisions or miscalculations can result in, for example, out-of-stock items or too few or too many employees on duty. These can result in loss of customer patronage or unnecessary labor expenses. Further, given that managers have control over what their superiors are informed about store operations, manager oversight is difficult, and dishonest managers are hard to uncover until losses have already occurred.

To further complicate the above situation, demographics indicate that the labor pool for such service oriented industries is shrinking, while at the same time the demand for employees in the service industries is ever increasing. However, since the cost of technology has been decreasing, applications of technology to service industries has been on the rise. This is evidenced by the use of automatic teller machines in the banking industry, automatic fare card machines in public transportation systems, automated security systems to supplement or replace guards in the private security industry, etc. However, the marriage of high technology and retail sales outlets has been slow in coming. This is in part due to public resistance to anything new, to anything perceived as not easy to use, understand or dehumanizing, and to computers in general. Additionally, the costs involved with such systems, the human factor in having such systems relate to employees and having employees capable of interfacing with such devices, and the flexibility that such devices would need in order to be able to respond to the day to day changes in the retail world have yet to be addressed.

U.S. Pat. No. 4,553,222 of Kurland, et al. describes a previous attempt to combine computer technology and customer inputting of orders in a sales environment in an attempt to reduce labor costs. In this system, restaurant customers order food through table station terminals located at their tables. Under control of a central computer, food orders are collected from the various table station terminals and displayed on central kitchen and bar monitors. Integrated into the system is an entertainment capability, which enables restaurant patrons to select entertainment through their table station terminals and interactively play video games and the like through their terminals.

While in theory the Kurland system would save costs related to a waitress taking orders from patrons at a table, many real life problems remain unaddressed. For example, some degree of computer literacy would be required in order for a patron to be able to interact with the rather complicated computer system required. Assistance for those not familiar with computers or those unable or unwilling to use computers is not readily available, and would tend to discourage some potential customers. Additionally, start-up costs for the required computer system would be high. The central computer would have to be relatively sophisticated and have large amounts of storage capacity, since it must be able to store all the data related to both entertainment and food ordering functions. Additionally, each table station terminal comprises a microprocessor having local storage capabilities for storing downloaded data from the central computer, as well as equipment which allows customers to play interactive games with the computer. Thus, the Kurland system is directed to a sit down restaurant that caters to computer literate clientele. The needs of a retail system, namely ease and simplicity of use, cost effectiveness and flexibility, are not addressed. The computer is part of the attraction of the restaurant, rather than a solution to the needs of a retail establishment.

U.S. Pat. No. 4,675,515 of Lucero discloses a credit card payment device for a drive-thru portion of a fast food restaurant. The pertinent portion of this patent is that a customer inputs his or her order directly into an ordering system at a drive-thru kiosk. The customer selections are displayed at a monitor in the main building of the fast food restaurant, and the selections can be displayed at a CRT video display at the kiosk. A CPU totals the selections, adds tax, and generates a total, which can be displayed at the kiosk. The rest of this patent concentrates on automated credit card payment for the order from the kiosk without any employee intervention.

Like the Kurland patent, the Lucero patent fails to address many factors that must be taken into consideration when designing an interactive ordering system. Simplicity of design, customer assistance issues, and system flexibility are simply not addressed. Further, beyond its basic function, the Lucero patent does not aid in the overall running of the restaurant. Clearly, a computer-based system is needed that will not simply reduce labor costs without addressing other problems. The system must not alienate customers, while at the same time have flexibility and improve the day to day operations and oversight of a retail store.

SUMMARY OF THE INVENTION

In accordance with the purpose of the invention and as embodied and broadly described herein, a customer operable ordering system is based on individual clusters, each cluster having an interactive cashier terminal, at least two interactive customer terminals for receiving customer input orders, and a processor for operating the cashier terminal and customer terminals. More than one cluster can be used in a system, with the processors of the various clusters being connected for communication therebetween. Each cluster may also include an interactive employee terminal located adjacent to the cashier terminal for selectively displaying customer input orders. Further, the plurality of clusters can be connected to a central processor which collects and consolidates order data from each cluster, and aids in the operation of management functions. The central processor may have an interactive control terminal associated therewith, and the system may further include a preparation terminal for displaying customer orders in an order preparation area.

Software is included for operating the above-described system so that when a customer inputs an order from one of the customer ordering terminals, the order is displayed at the associated cashier terminal. Selected items can be displayed at the cashier terminal instantaneous with when the items are selected by the customer, when the customer changes menu screens, or when the customer has finished ordering. A running total and list of items ordered is displayed at the customer ordering terminal during ordering, and at the end of ordering, the processor automatically calculates the total amount of the order and displays the total amount due at both the customer ordering terminal and the interactive cashier terminal. After a cashier inputs the amount of money tendered by the customer, the processor displays the amount due and calculates and displays the change due at both the cashier and customer terminals. If two customer orders are being input at one time, the cashier can manipulate the cashier terminal so that one or both of the orders are selectively displayed.

The present invention also provides a method for automatically calculating the effect of a coupon on the amount due for a customer order. Either a coupon identification code is input by the cashier or a bar code reader is used to read a bar code on the coupon to obtain the coupon identification code. The processor accesses stored data corresponding to the coupon identification code, checks the order to make sure that an item for which the coupon is valid has been ordered, and calculates the discount to be taken and recalculates the total due. Error messages are displayed if the customer order does not include a valid item, or the coupon has expired or is not valid on the day or at the time of day it is presented.

Further, the present invention provides software for performing an automatic suggestive selling routine. After a customer indicates that the order is finished, the processor counts the number of items ordered from a primary category. If no items from this primary category have been ordered, a screen suggesting items from the primary category is displayed on the customer monitor. If additional categories have been defined, the number of items selected from the next defined category is counted, and compared to the number of items selected from the primary category. If this number is less than the number selected from the primary category, a screen suggesting items from the next category is displayed on the customer monitor. If further categories have been defined, this last step is repeated until the categories are exhausted.

Software for the present invention also provides a self-teaching aspect. A first screen displayed on a customer monitor to a customer has a single box instructing the customer to touch it to begin ordering. Upon touching that box, a second screen is displayed having more than one box. The customer is asked to input information pertinent to the order by touching the box. Subsequent screens display a plurality of boxes, at least one of which when selected will provide customer assistance information.

Software is also provided by the present invention for improved customer service. One such subroutine is for consolidating orders belonging to individual members of a group into a single order. This is accomplished by designating one or more customer terminals at a cluster for ordering by members of the group only. Orders are taken from each individual member of the group and filled in the normal way, except that each individual member of the group does not pay, and data regarding the group members' orders is accumulated. After all the group members have ordered, the processor calculates the total cost and can display each individual order and group totals.

A second software subroutine for group ordering is also provided. A group is designated, and individual members of the group can enter orders at any customer ordering terminal. Each order is filled in the usual way, except that the cashier enters into the cashier terminal that the order is part of the designated group, and does not collect money. After the last individual member of the group has ordered, information accumulated from each individual order is combined, and the processor calculates the total cost.

Software is also provided by the present invention for allowing for special orders. Upon selecting a proper box, the processor will display a list of special order options associated with one of the ordered items. When a special order option is selected, that option is listed next to the ordered item on a video receipt. Different items from the order can be selected for displaying associated special order options.

Some of the objects and advantages of the present invention are clearly identifiable from the above description of the present invention. Other objects and advantages of the present invention will be set forth in part in the description and drawings which follow, and, in part, will be obvious from the description or may be learned by practice of the invention. The present invention will now be described with reference to the following drawings, in which like reference numerals denote like elements throughout.

BRIEF DESCRIPTION OF THE DRAWINGS

FIG. 8 illustrates a cashier screen for display on a cashier monitor;

DETAILED DESCRIPTION

Reference will now be made in detail to the present preferred embodiments of the invention, examples of which are illustrated in the accompanying drawings.

In a traditional retail or fast food establishment in which employees prepare or collect ordered items, a customer approaches a counter and verbally places his or her order with an employee. The employee either writes down the order, or enters the order into some type of ordering system by pressing the appropriate places on a keypad of some type or entering the appropriate codes into the ordering system. Accordingly, there is a one to one correspondence between each individual customer that is ordering and each counter employee. Additionally, as the order is verbally communicated to the counter employee, it is common for the employee to mistakenly enter the order into the ordering system or write down the order incorrectly. Worse yet, the employee may not enter the order at all, and simply not charge the customer or pocket the money paid by the customer. As there is no record of the transaction made, such theft is difficult to catch or prove. In the situation where the order is written down, the order must usually be communicated to other store employees for filling of the order, and further miscommunication is possible. When the order is entered into an ordering system by the employee, the order may or may not be electronically communicated to other store employees. In either case, both the customer and the store must rely on the employee to properly enter, add, calculate or total the order, collect the proper amount of money and make the proper change. The customer can almost never be sure that he or she has received the proper items or was charged the proper price until after the transaction is completed. Usually only at this time can the customer inspect the items he or she received and/or inspect the receipt, which may or may not include enough information to sufficiently inform the customer about each individual item included in his or her purchase.

The present invention seeks to overcome these problem areas and reduce labor costs at the same time, while assuring customer satisfaction.

As discussed above, the present invention has applications in many types of retail sales operations, particularly those in which orders are prepared or gathered in employee areas, such as fast food restaurants, catalog showrooms, auto part stores, etc. The following description will be made in reference to an application in a fast food restaurant. It will be appreciated by those skilled in the art that by providing slight modifications to the configuration of the present invention and the operating software described below, the present invention can be easily adapted for use in many different retail areas.

Figure 1:
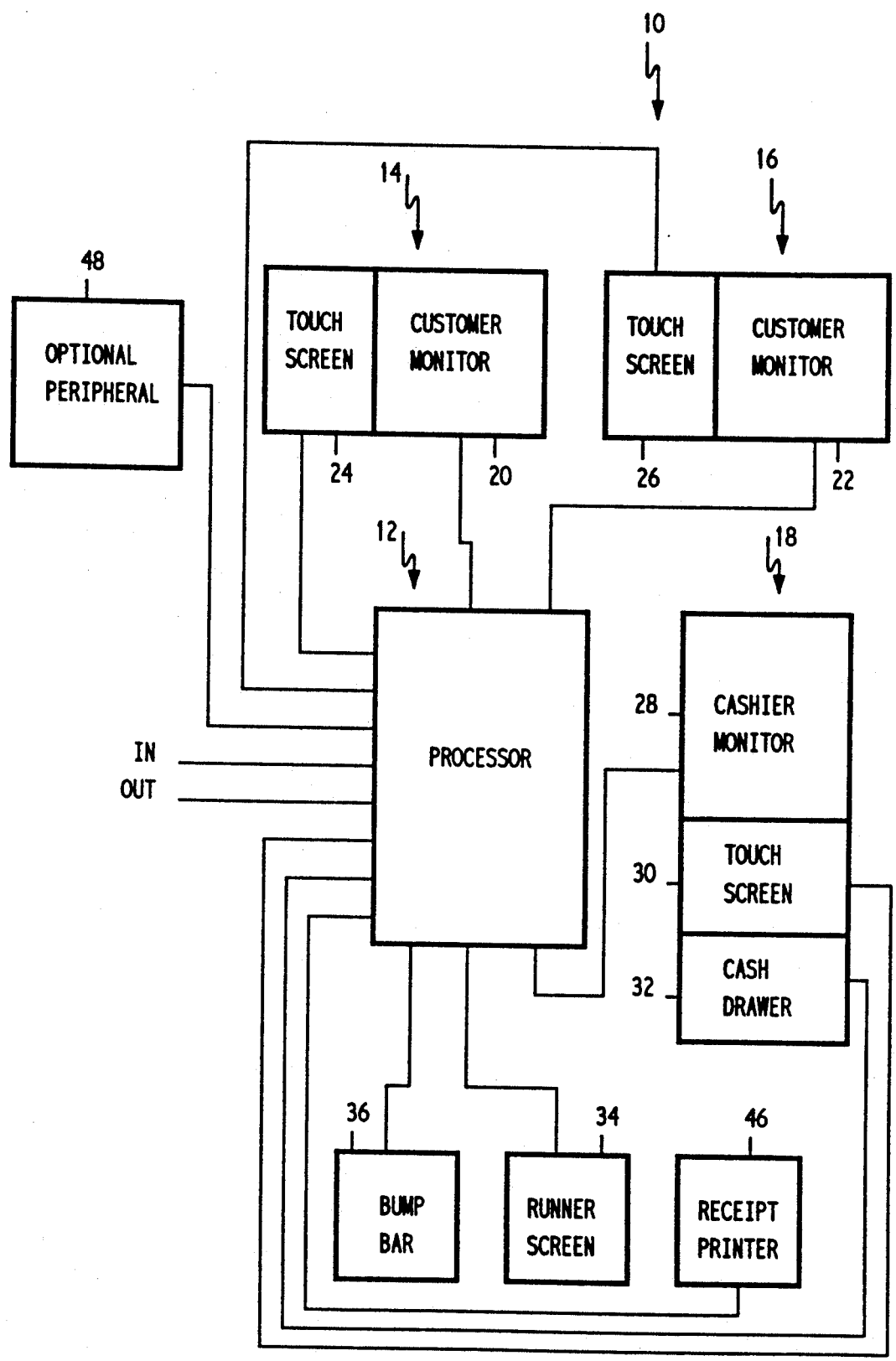
FIG. 1 illustrates a basic configuration for a cluster according to the present invention.

In FIG. 1, a basic cluster 10 according to the present invention is illustrated. One major advantage of the present invention is that the system is designed on the modular concept. A single system in operation in a retail sales environment can consist of a single cluster 10 having a minimum of peripheral devices included therein, or a plurality of attached clusters 10 having additional devices attached thereto, as will be explained later. This permits both relatively low start-up costs and future expansion.

The heart of each cluster 10 is a processor 12. In the fast food application, the processor 12 for each cluster 10 will usually be situated underneath the ordering counter of the restaurant. In the preferred embodiment, the processor 12 is an IBM PS/2 Model 30 computer having a 30 megabyte hard disk unit and 640K RAM. The processor 12 controls the various devices within the cluster 10.

Customer terminals 14, 16 are provided in each cluster 10, the customer terminals being controlled by the processor 12. The key to labor savings is that the customer inputs his or her own order through one of the customer terminals 14, 16. For optimum employee efficiency, at least two such customer terminals should be included in each cluster 10. Each cluster 10 can be operated by a single employee who operates a cashier terminal 18, which can display at least one of the customer orders as it is being entered by the customer. Thus, while previously one employee could only take an order from one customer at a time, with the present invention two customers (or more if a cluster includes more than two customer terminals) can be inputting orders at a time. In the meantime, the employee is free to gather the ordered items as they are being ordered. In this way, customer throughput speed is increased while fewer employees are needed.

Two customer terminals are illustrated in the cluster 10 of FIG. 1. However, the cluster may be configured to have more than two customer terminals. The exact number and arrangement of the customer terminals depend on the intended use. The customer terminals 14, 16 are designed to be as user friendly as possible, using a combination of hardware and software which render the customer terminals 14, 16 easy to use and self-teaching. Preferably, the customer terminals 14, 16 include color monitors 20, 22 and touch screens 24, 26, respectively. The customer monitors 20, 22 can be IBM Model 8512 color monitors, which have a 14-inch diagonal display area. The monitors 20, 22 are recessed into the counter or otherwise positioned such that they be easily and comfortably accessed and viewed by the customer. The customer monitors 20, 22 are connected to a dual VGA card (not shown) in the processor 12 via conventional hardwire connections so that the processor 12 can control the display on the customer monitors 20, 22. The touch screens 24, 26 are positioned over the screens of the customer monitors 20, 22. When a display on one of the customer monitors 20, 22 having a plurality of "boxes", each representing item or function, is displayed, the touching of one of these boxes will cause the choice of that box on the screen to be registered in the processor 12. The touch screens 24, 26 are connected to the processor 12 by serial cables which input to the processor 12 through one of the ports on a serial card (not shown) in the processor 12. In the preferred embodiment, an eight-port serial card is utilized. This effectively limits the number of peripherals that can be attached to the processor 12 to a number that will not slow the reaction speed of the processor 12 too noticeably. The ordering process itself will be described in detail below.

The cluster 10 also includes the cashier terminal 18, which is preferably mounted in close proximity to the customer terminals 14, 16 so that the employee operating the cashier terminal can render customer assistance and otherwise interact with customers as necessary.

Alternatively, the cashier terminal 18 can be located remotely from the customer terminals 14, 16. The customer terminals 14, 16 can be located at separate drive-up locations, so that customers in different cars can simultaneously input orders. The drive-up locations funnel into a single order pick-up locations, at which the cashier terminal 18 is located. Any given cashier terminal 18 can have more than two customer drive-up terminals associated therewith, and more than one drive-up cashier terminal 18 can be employed. However, the key for reducing labor costs is that each single drive-up cashier terminal should be associated with at least two customer drive-up terminals.

Further, in some applications, it may be necessary to have the customer terminals situated at locations within the store but away from the associated cashier terminal, such as in a kiosk located in the lobby, for example, of the retail establishment. Alternatively, customer terminals remote from the associated cashier terminal can be used in combination with counter-situated customer terminals. This is especially useful in overflow situations, when the counter area is overcrowded.

An employee interactive portion of the cashier terminal 18 includes a monitor 28 and a touch screen 30, which is positioned over the monitor 28. The cashier monitor 28 may be color or monochrome, and is connected to the processor 12 by a conventional cable through the appropriate card (not shown) in the processor 12. The touch screen 30 is connected to the processor 12 through one of the ports of the serial card (not shown). The cashier terminal 18 serves several purposes. The cashier terminal 18 can monitor a customer order as it is being entered, or can be used to input or change a customer order as necessary. Further, in addition to all the functions available at the customer terminals 14, 16, certain control functions can be performed through the cashier terminal 18. Although a touch screen is the preferred input device, a keyboard, a mouse, etc. can be employed in place of a touch screen. Also associated with the cashier terminal 18 is a cash drawer(s) 32, which is connected to the processor 12 via a cable through one of the ports of the serial card. The cash drawer(s) 32 is controlled by the processor 12 in the manner not unlike the control for a cash drawer in a typical cash register or point of sale system. Two cash drawers 32 may be employed at the cashier terminal 18. The second cash drawer 32 will usually be used by a temporary cashier who takes over the cashier terminal 18 when the primary cashier is taking a break or otherwise occupied. This permits the one cashier per cash drawer concept to be retained. This concept decreases likelihood of employee theft, since only a single non-management employe should have access to each cash drawer 32.

In the preferred embodiment, the cluster 10 also includes an additional monitor situated in close proximity to the cashier monitor 28. This additional monitor is defined as a runner monitor 34, which allows the store employee stationed at the cashier terminal 18 to monitor incoming orders from both of the customer terminals 14, 16 at the same time by using the runner monitor 34 and the cashier monitor 28. It is in this way that the labor savings and the efficiency of the present invention are magnified. With the store employee being free from having to take orders from customers who are having difficulty or are taking a long time in deciding what to order, the store employee is free to fill orders for two customers as they are being input into the respective customer terminals 14, 16 and then obtain payment and make change for the customer who finishes first.

Figure 2:
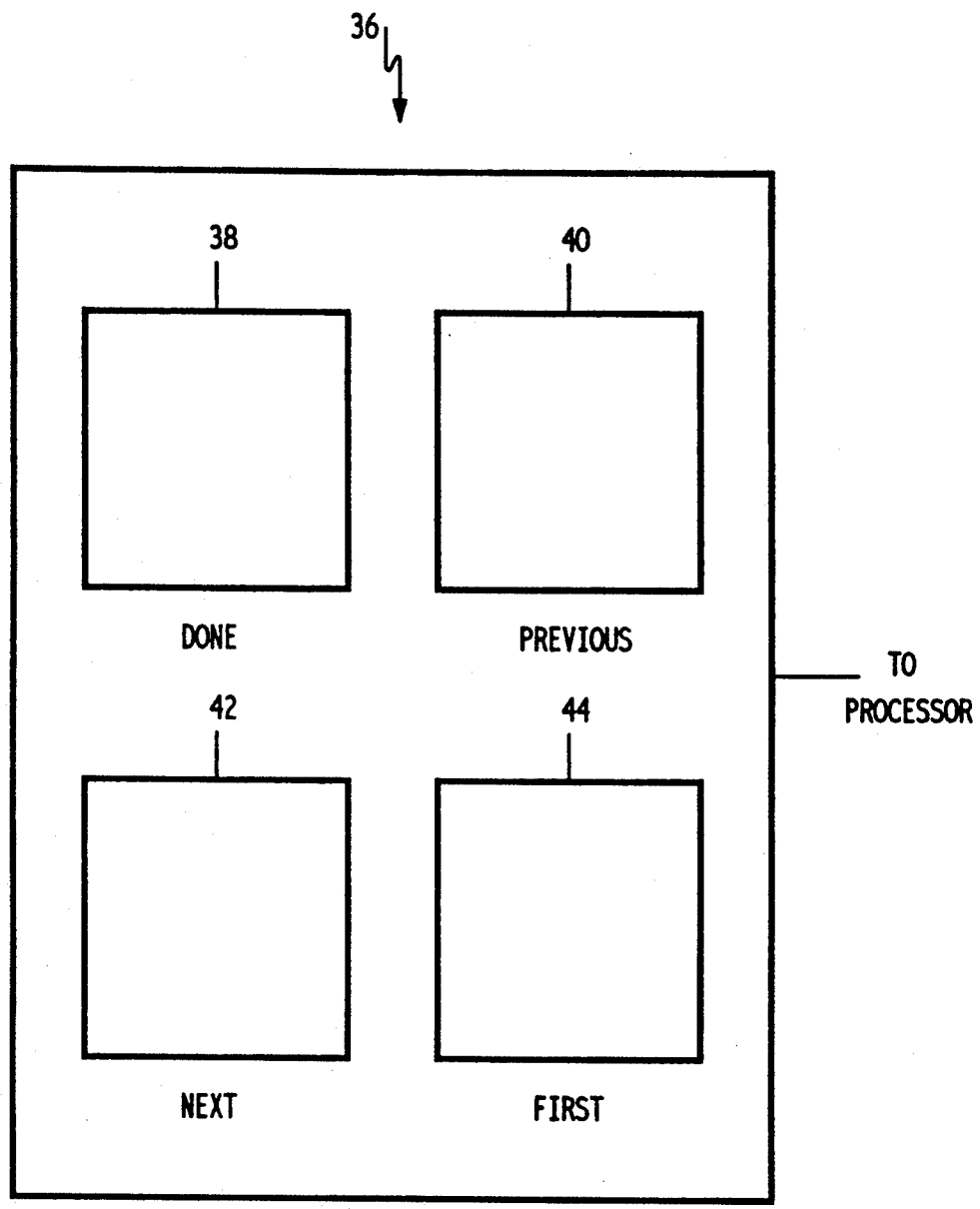
FIG. 2 illustrates a bump bar included in the configuration of FIG. 1.

It is not necessary that the runner monitor 34 be able to perform all the system functions due to its proximity to the cashier terminal 18. The runner monitor 34 is preferably monochrome, and is attached to the processor 12 over a conventional cable through a monochrome card (not shown) in the processor 12. The customer order or orders being displayed on the runner monitor 34 can be changed by a bump bar 36 associated therewith. The bump bar 36 is connected to the processor 12 over a bump bar cable which connects to a bump bar card (not shown) in the processor 12. The bump bar 36 is shown in more detail in FIG. 2. The runner monitor 34 usually displays one or more customer orders as they are being received from the customer terminals 14, 16. The bump bar 36 enables the store employee to control which order is being displayed on the runner monitor 34. As illustrated in FIG. 2, the bump bar 36 will generally include only four buttons. While two or more orders may be displayed on the runner terminal 34 at one time, for simplicity, one of the orders will be surrounded by a box. When the store employee has filled this order, by hitting a "done" button 38 on the bump bar 36, the box will be shifted to surround an unfilled order, if any. A "previous" button 40 is used to recall the previous order, and is useful when a previous order has been removed from the monitor 34 by the processor 12. Similarly, a "next" button 42 will cause the next sequential order input into one of the customer terminals 14, 16 to be displayed on the runner monitor 34. A "first" button 42 allows the first order input into the cluster 10 during a predetermined time period since the cluster 10 was initialized to be recalled from the hard disk of the processor 12 and displayed on the runner monitor 34.

The cluster 10 can also include a number of other peripheral devices. These include a receipt printer 46 for printing customer receipts, reports, credit card receipts, etc. Optional peripheral device 48 can be a magnetic strip reader for obtaining information from credit cards, which would then be processed by the processor 12 as required. Alternatively, the optional peripheral device 48 can be a bar code reader for reading the bar code from coupons and the like. If a bar code reader is added, coupons can be automatically input by the employee or the customer and automatically, efficiently, and accurately processed by the processor 12 in a manner which will be described below. This function can eliminate any uncertainty regarding coupons. Further, the optional peripheral device 48 can be a preparation screen which can display one or more customer orders as they are being input. Such a preparation screen would be located in an area of the retail establishment where the order is actually prepared and need not be located at the counter with the customer terminals 14, 16, the cashier terminal 18 and the runner monitor 34.

When the cluster 10 is based on the type of processor described above, the above described system having a single optional peripheral device 48 will provide satisfactory speed at an affordable cost. By upgrading the processor, additional peripheral devices, such as additional customer terminals, preparation screens, etc. can be added to each cluster 10. Further, the present configuration can be changed to provide more of one type of peripheral device and fewer of another, if the application so requires for improved efficiency.

The hard disk (not shown) of the processor 12 stores customer order data as it is input. Alternatively, customer data can be stored in nonvolatile RAM. Loss of data stored in this way due to power outages is prevented by an electrical back-up system, which can run the overall system for a short period of time. This time allows a store manager to save data onto more permanent storage media and shut down the system in an orderly manner, if necessary. Reports regarding the sales for the cluster 10 can be generated using this data. Further, the hard disk can store a variety of programs for not only running the cluster 10 but aiding in the overall operation of the retail establishment. Accordingly, a single cluster 10 can be configured and act as an entire customer input point of sale system. However, in applications which have heavy customer traffic and require more than two customer stations, it is more effective to use a plurality of clusters 10. For this reason, two ports in the serial card of each processor 12 are reserved for the input and output of data to other clusters or computers.

In multiple-cluster systems, it is preferred that a plurality of clusters 10 have their processors 12 connected such that the array of clusters 10 forms a loop. This helps to insure communication integrity in case one line is disconnected. In this way, data regarding all of the clusters can be communicated to one cluster, where the data can be accessed, combined for a report, stored, printed out, etc.

Figure 3:
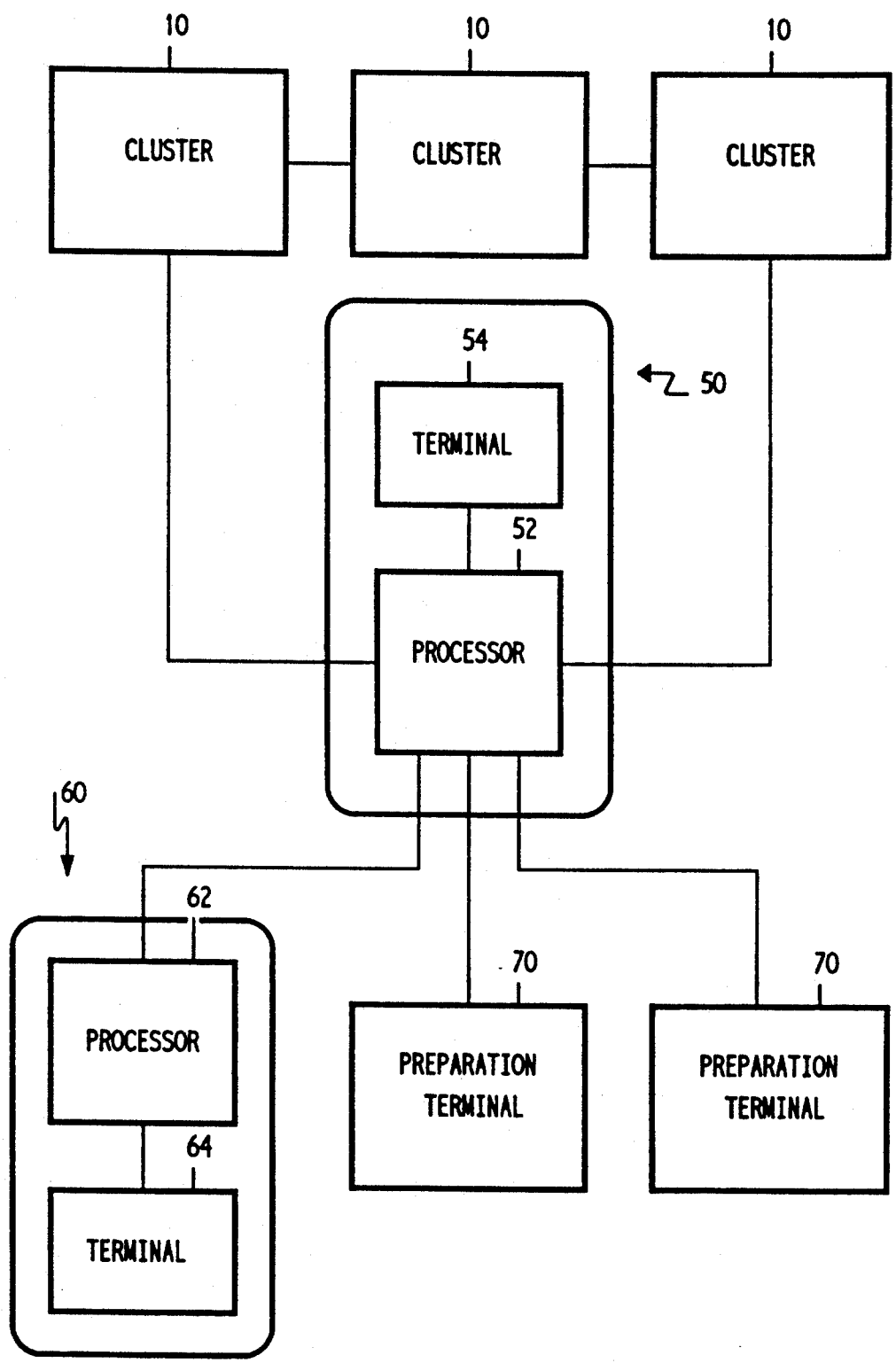
FIG. 3 illustrates a grouping of clusters configured with controlling and oversight hardware according to another embodiment of the present invention.

As illustrated in FIG. 3, another processor 52 can be included in the overall system for overseeing the individual clusters and accumulating and consolidating data from each cluster. Such a processor is included in a consolidator 50. In such a system, all order data is forwarded from each cluster 10 to the consolidator 50. Also, data regarding total sales, product mix, drawer counts, skims, paid outs, etc. is forwarded to the consolidator 50. The consolidator 50 performs a general overseeing function during routine operation in system having several clusters. For example, the consolidator 50 can track and combine individual orders input to the various clusters that belong in a group order. This procedure will be explained later.

Further, the system can perform a time clock function, or process data from each cluster when a cashier terminal is being used by an employee to clock in or clock out. In this way, an employee can clock in at any cluster 10, the data being sent to the consolidator 50. Thus, an employee cannot clock in twice at two different clusters 10. Additionally, the employee work schedule can be stored by the system. This can prevent employees from clocking in early and clocking out late, or having others clock them in early and/or out late, in order to gain credit for additional time worked. For example, if an employee tries to punch in early or punch out late, the system can refuse to allow the entry without manager approval. The consolidator 50 keeps track of the hours worked by each employee for payroll and generate reports therefor as needed.

Optionally, a terminal 54 can be included with the processor 52 in the consolidator 50 for accessing the data accumulated therein. Otherwise, the consolidating processor 52 can be accessed from one of the clusters 10 or an optional manager station, as will be described below. The terminal 54 can comprise a monitor having a touch screen and a printer, or a monitor having keyboard entry means and a printer. If the consolidator 50 includes this equipment, the consolidator 50 may also serve as a manager workstation.

Alternatively, the system may include a manager workstation 60. The manager workstation 60 includes a processor 62 and a terminal of some type as well as a printer. The manager workstation 60 is not in the loop, but is attached to the loop. An employee working at the manager workstation 60 would be able to perform general oversight functions from the manager workstation 60. Information can be obtained from the consolidator 50 as needed, and reports processed, information stored away as desired, schedules set, etc. Additionally, information from the various clusters 10 can be forwarded to the manager at the manager workstation 60 as necessary. For example, the manager can be told that a cash drawer at one of the cashier terminals needs to be skimmed, help is needed at one of the cashier terminals, etc.

Depending on the configuration, a cluster 10, consolidator 50 or manager workstation 60 can be used to generate daily, weekly and/or monthly reports. These reports can indicate total sales, sales breakdowns, labor reports, inventory, etc. The information included in such reports can also be used to prepare future work schedules, order new inventory, etc.

Another option is that one or more preparation terminals 70 can be run off the consolidator 50 in accordance with the specific needs of the retail establishment. If the retail establishment sells only a single product line, like many fast food restaurants, the preparation terminal 70 can consist of a display only which lists the required items to be collected or prepared. Alternatively, the preparation terminal 70 may consist of a monitor and a bump bar so that individual orders can be displayed together for collection or preparation.

If more than one preparation site exists, or different preparation sites are required for different product lines, two or more preparation terminals 70 may be required, with the consolidator 50 sending the appropriate orders or portions thereof to the appropriate preparation terminals 70, or the consolidator 50 splitting the orders between preparation terminals 70 so that the preparation terminal with the least backlog receives the next order to be processed. Alternatively, all of this information can be sent to a dedicated preparation processor, which can then split up the work between individual preparation terminals 70 as required. The preparation terminals 70 can be programmed to instruct employees to prepare items which take a relatively long time to prepare. Such items include fried chicken, roast beef, etc., and such decisions can be based on the time of day, day of the week, weather, time of year, past selling history, etc.

The manager workstation 60 may also be provided with a modem for enabling communication with another computer system. This is especially useful if the retail establishment is one of many like establishments under common ownership or management. A modem would enable a central computer to quickly and efficiently obtain data and information from a plurality of like systems at various retail outlets.

The operating system of the present invention will now be described with reference to FIGS. 4–23.

Figure 4A:
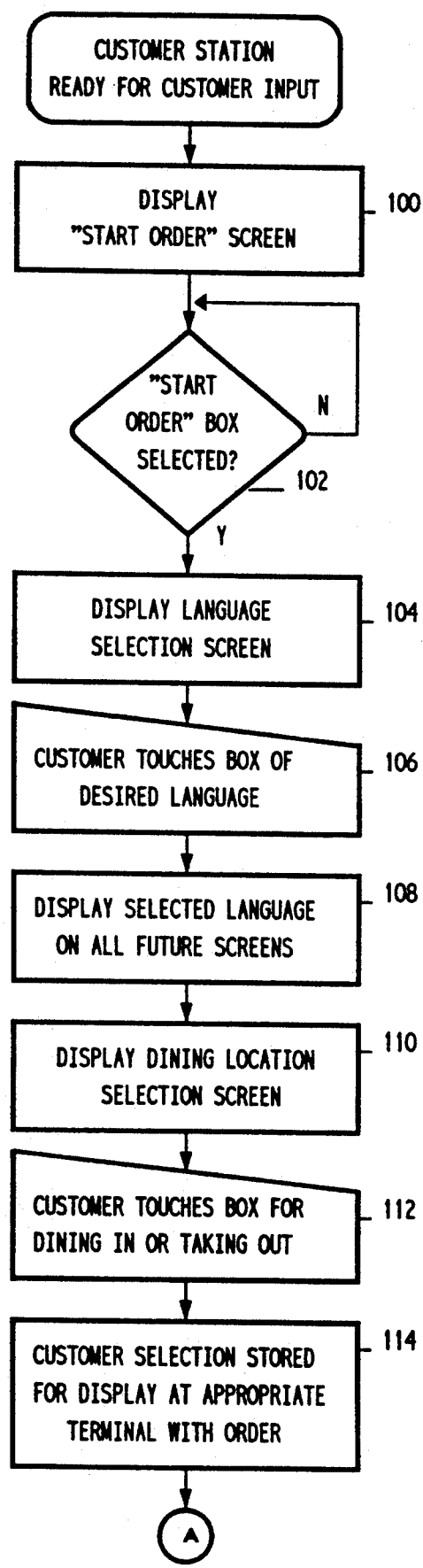
FIGS. 4A, B and C are primary flow charts for the operation of the present invention.
Figure 4B:
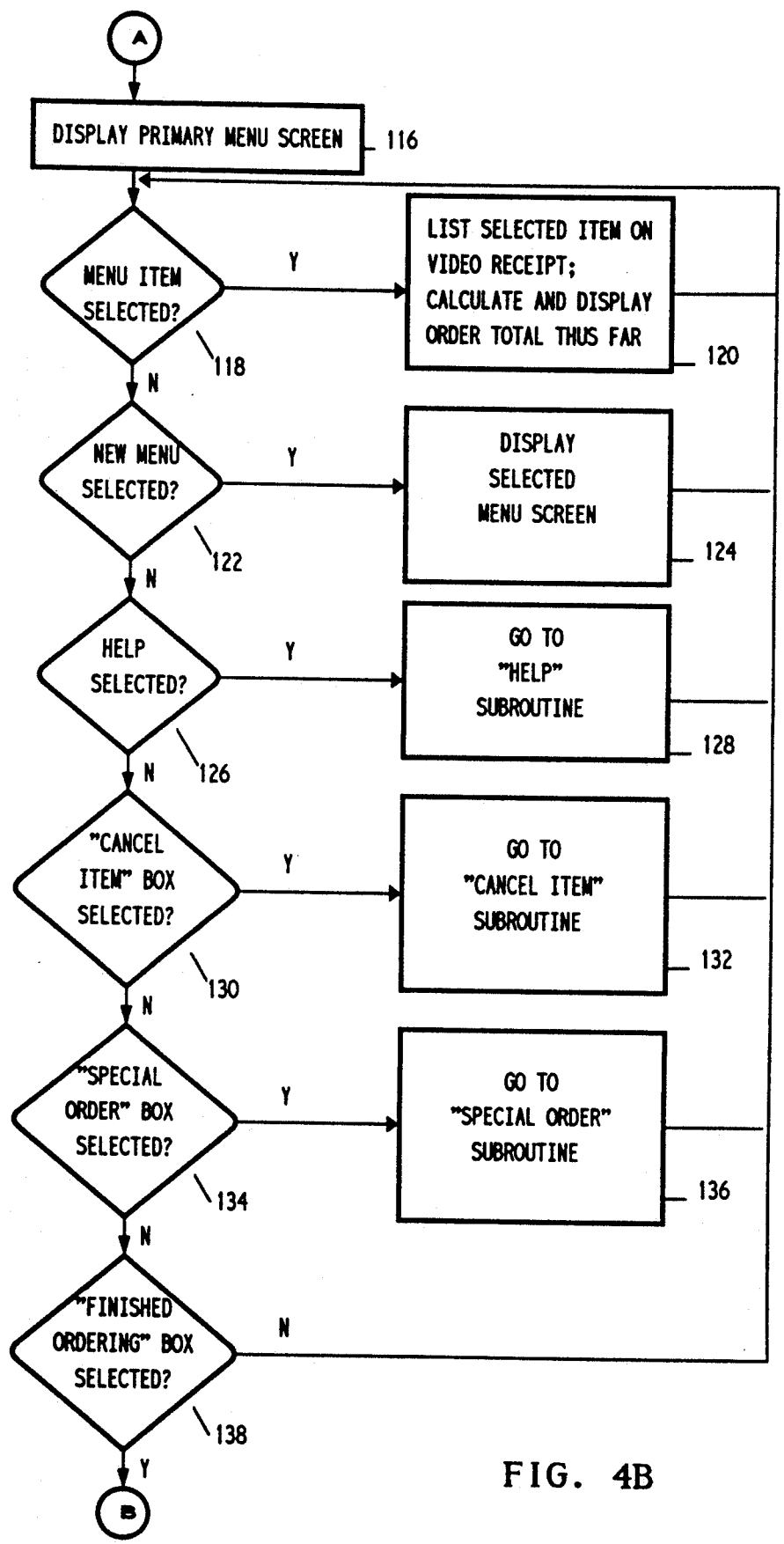
Figure 4C:
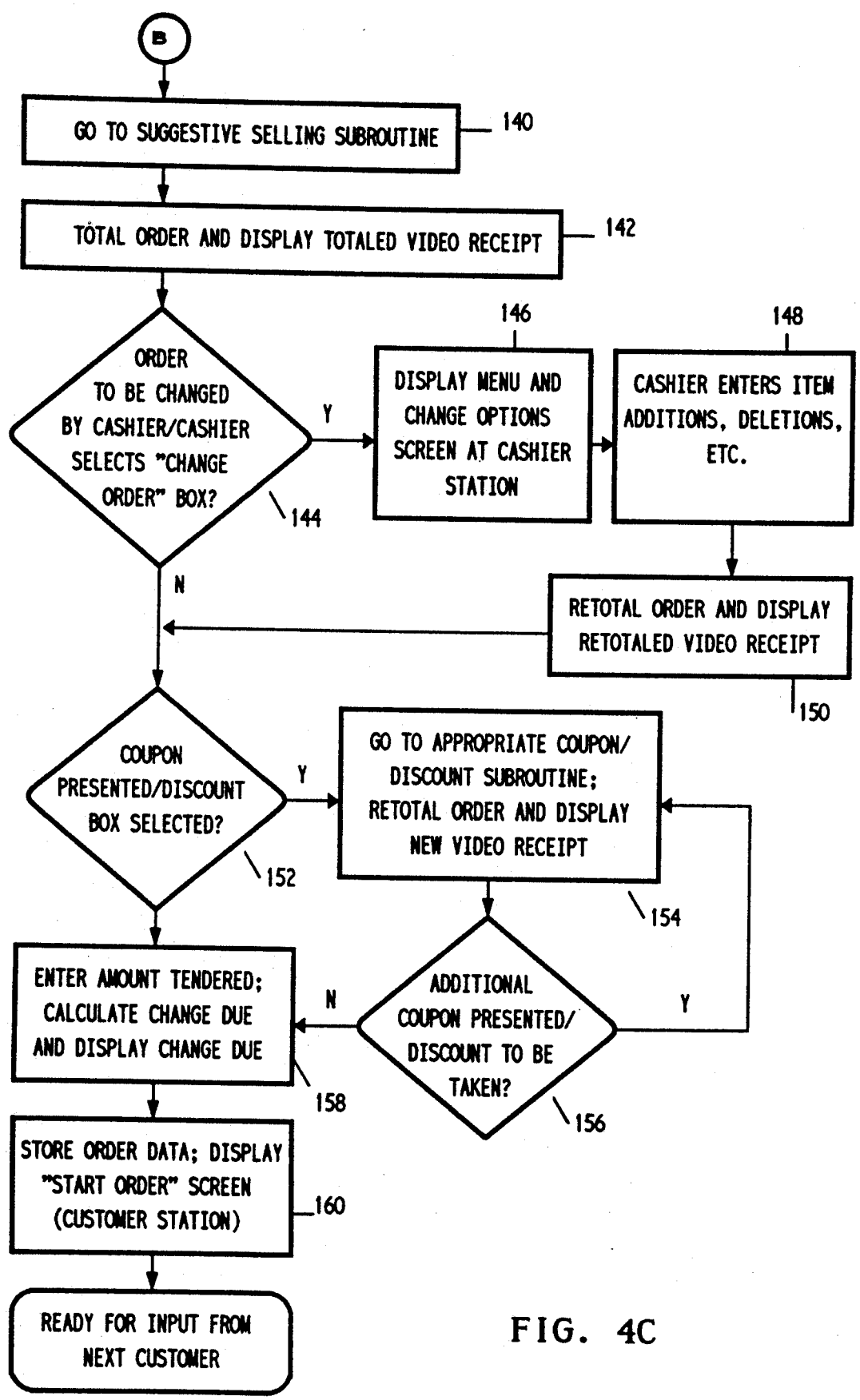

FIGS. 4A–4C illustrate a flowchart of a primary operational program for implementing the above-described system in a fast food establishment. Many different implementations are possible and would be preferable in different retail environments.

Figure 5:
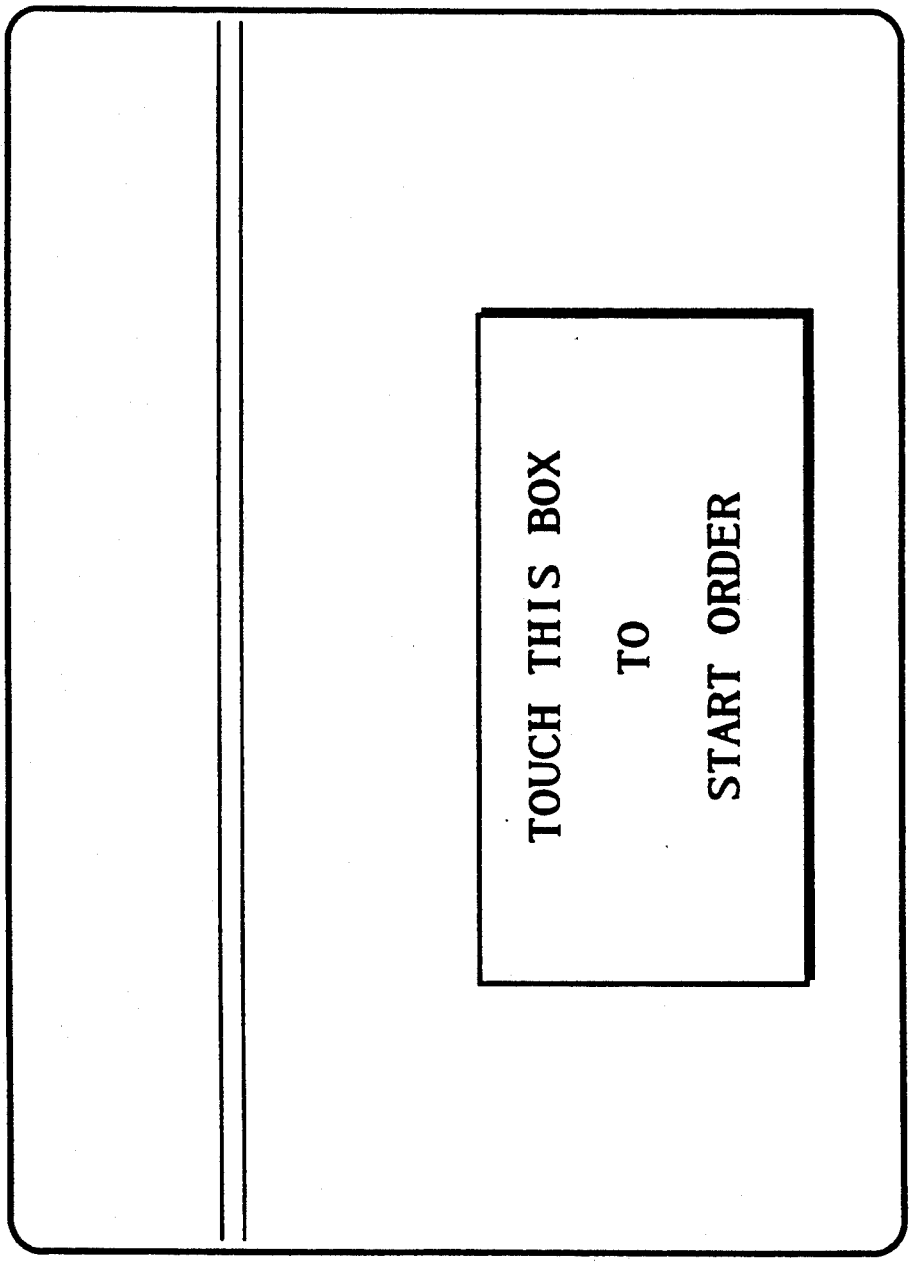
FIG. 5 illustrates a start order screen displayed on a customer monitor at the beginning of the ordering process.

Upon initialization of one of the customer terminals at a cluster, the processor 12 causes a "start order" screen to be displayed on the monitor at the customer terminal (step 100). Such a screen, which incorporates a self-teaching aspect, is illustrated in FIG. 5. A large "box" is displayed on the customer monitor, which informs the customer to touch the box when the customer wants to start ordering. The box need not be rectangular, but can be any shape. Actually, a box can be any definable portion of the touch screen. A "box" can be circular, square, in the shape of an item that can be ordered, etc. Preferably, the area defined by a box on the monitor is contemporaneous with the portion of the touch screen which will, when touched, register an "input" of that box. However, the active region of the touch screen which causes selection of a box to be input can be larger or smaller than the box, depending on the application.

The touch screen operates such that when a portion of the touch screen is grounded, such as by touching with a finger, the coordinates of the grounded portion are communicated to the processor 12. The coordinates of the box on the customer monitor relative to the touch screen are previously identified and stored by the processor 12, as are the coordinates of any subsequent box to be displayed at each monitor. Thus, based on the coordinates of a grounded portion of the touch screen, the processor 12 will proceed in accordance with pre-programmed instructions associated with a box corresponding to the ground coordinates.

Alternatively, other types of touch screens may be employed, such as infra-red touch screens. Infra-red touch screens indicate position of a touch from broken infra-red beams. Further the screen of the monitor itself can be touch sensitive, using strain gauges to detect touch locations.

This first screen provides only a single option for the customer. When this option is exercised by the touching of the only box on the screen (step 102), the program proceeds and causes the next screen to be displayed, indicating to the customer that his touch has caused the ordering process to continue. Until the "start order" box is touched, the "start order" screen is continuously displayed. If a customer terminal has not been initiated for accepting customer orders while the store is open, the customer terminal can be used to display informational messages or advertisements.

Alternatively, in areas in which multiple languages are commonly used, the first screen displayed by the processor 12 at the customer terminal may have a number of boxes, each in a different language, each instructing the customer to touch it to begin the order if the customer wishes the following screens to use the language of that box. Alternatively, the language selection screen may appear on the second screen (step 104). After the customer has selected the box indicating his or her choice of language in step 106, the processor 12 will display future screens using the language selected by the customer (step 108). This is accomplished by accessing a portion of memory having stored therein the symbols corresponding to the language selected for the display screens. Language selection at one terminal does not affect the language in use at any of the other terminals. Further, any of the other terminals in the system can use any available language. This is especially useful in case a store employee speaks or is more familiar with a language other than English, and can help to reduce training time and costs in such instances.

Figure 6:
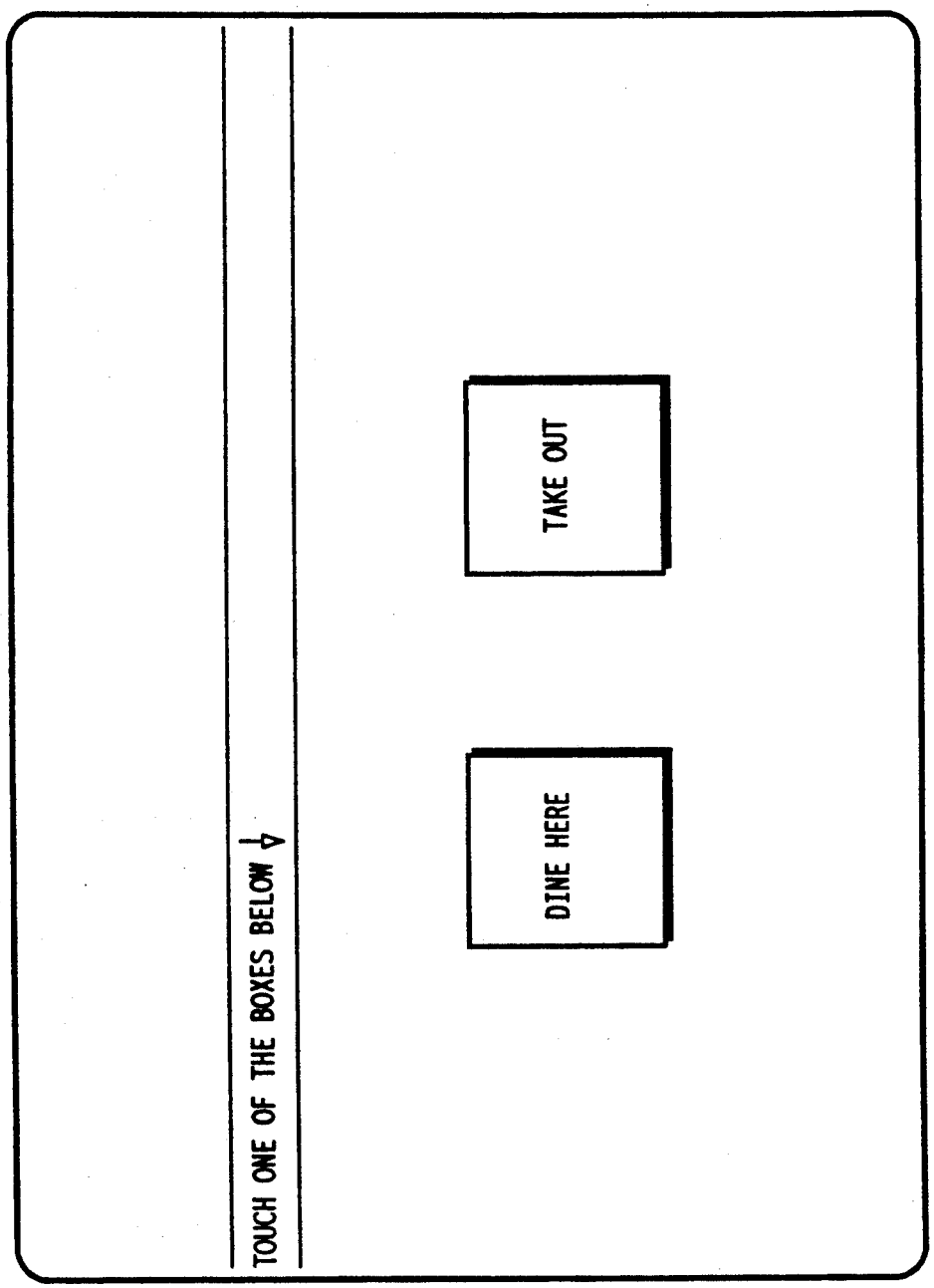
FIG. 6 illustrates a dining location selection screen for display on the customer monitor.

The next display screen to be displayed has two boxes, and asks the customer if he or she will be dining in the restaurant or taking his order out (step 110), as illustrated in FIG. 6. This display serves two purposes. First, as there are only two boxes and the request is quite clear, the customer becomes further acquainted with the concept of touching the boxes to communicate his or her order. Second, the order will now be tagged appropriately in case the ordered products are to be packaged differently for dining in versus taking out. After the customer inputs the dining location information by selecting the appropriate box (step 112), the system stores this information (step 114). At this time the system will display a primary menu screen (step 116), as illustrated in step 116 of FIG. 4B, and begin actual ordering.

A number of different requirements need to be satisfied in designing the primary menu screen. First of all, the size of the selection boxes must be considered. The boxes must be of sufficient size to display within their boundaries an easily readable written description of the selection they represent, and be of sufficient size so as to be easily discernible and selectable by a customer so that the customer cannot easily touch a neighboring box when attempting to touch a first box. Research by human factors engineers have found that a minimum size for such boxes for customer interaction is ⅜" square. Additionally, in the preferred embodiment, a video receipt is also displayed on the customer monitor in addition to the boxes. The video receipt indicates which items the customer has selected at any point of time during ordering. In this way, the customer knows that an action he or she has taken has elicited a response from the system. This gives the customer a feeling of control, increases the customer's comfort level, and continues the self-teaching aspect of the system. The video receipt may or may not include the price of the ordered items and a total for all of the items ordered at any given time.

Figure 7:
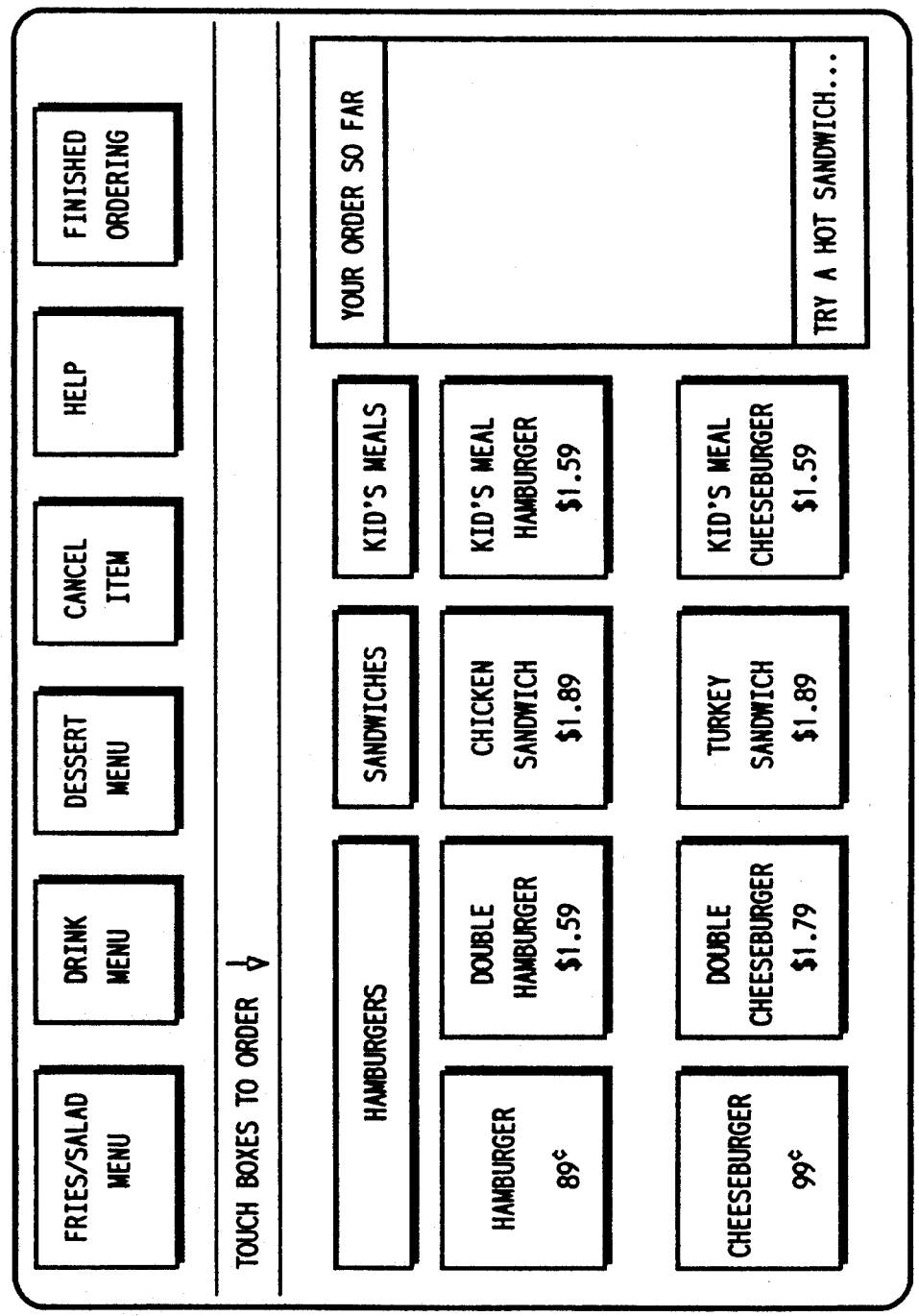
FIG. 7 illustrates a primary menu screen for display on the customer monitor.
Figure 9:
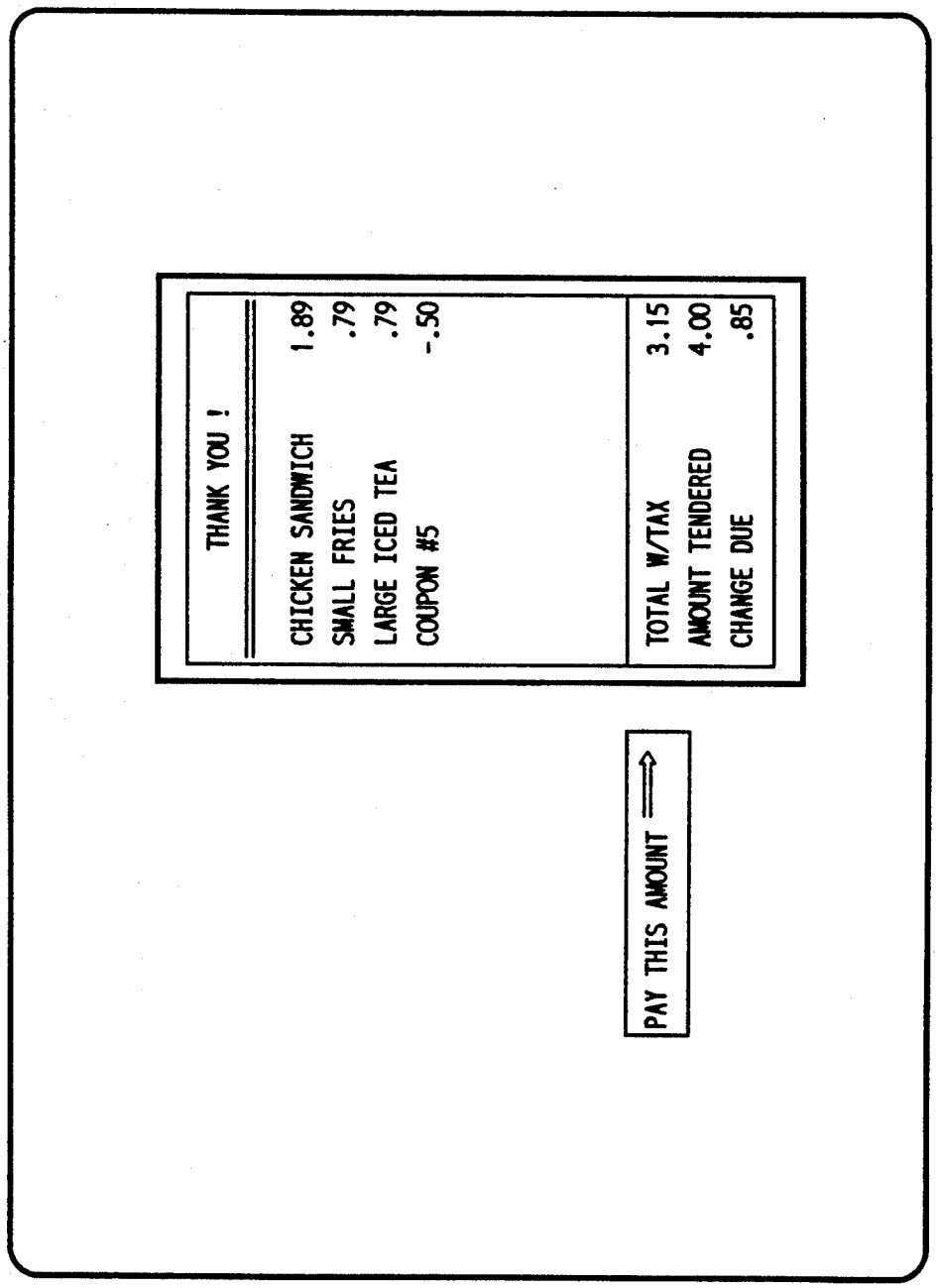
FIG. 9 illustrates a total/change due screen for display on the customer monitor.

One such menu screen is illustrated in FIG. 7. In a fast food environment, the primary menu screen preferably includes primary food items, such as hamburgers, chicken, or the items which are the specialty or primary attraction of the particular restaurant. As illustrated in FIG. 7, a primary menu may include sandwiches. These boxes are displayed in an item selection region of the customer monitor. Each selection is listed within a box and may be displayed together with its price. A second section of the customer monitor is reserved for function boxes. Function boxes serve a variety of purposes. Use of the boxes can cause different menus to be displayed, an ordered item to be cancelled, special order options for an ordered item to be displayed, a help screen displayed, indicate that the customer has finished ordering, etc. Many of these functions will be described below. A third section of the customer monitor can be reserved for the video receipt, which lists the items ordered so far. Alternatively, in order to reserve more room on the touch screen for menu items, the video receipt can be displayed on a small dedicated monitor located in close proximity to the customer monitor. Such a dedicated monitor does not need a touch screen overlay.

The options available to the customer are provided for in the flow chart of FIG. 4B. The processor 12 performs an operation in response to the box that is selected. For example, in step 118, if one of the menu items is selected, that item is listed on the video receipt together with its cost and the total of the items ordered thus far. That item is also displayed on the cashier monitor or runner screen if space is available on one of them, or stored until the order is called up by an employee for display. Additionally, the item can be displayed on a monitor in the appropriate preparation area, depending on the configuration of the system. Alternatively, displaying of the ordered items at employee monitors can be delayed until the customer completes the order, in case the customer changes his or her mind. After selection of an item, the same menu screen remains displayed on the screen, awaiting the next customer input. Should one of the alternative menu boxes be selected from the function boxes at the top of the monitor, as illustrated in FIG. 7 (step 122), the processor 12 will cause the menu screen for the selected menu to be displayed (step 124). The only differences between the newly displayed menu screen and the previously displayed menu screen are that different items are available for customer selection and that the new menu is no longer an available function box selection, while the previous menu is an available function box selection in case the customer wants to return to that menu screen.

Similarly, if the customer selects the "help" box (step 126), the "cancel item" box (step 130), or the "special order" box (step 134), the processor 12 accesses the appropriate subroutine from memory. These subroutines will be explained in detail below. Depending on the environment, additional and/or different function boxes can be used.

The customer indicates that he or she has finished ordering by selecting the "finish ordering" box (step 138). At this time, the processor 12 may optionally cause a suggestive selling subroutine to be entered (FIG. 4C, step 140), which will be explained later.

When the suggestive selling subroutine ends, or if no suggestive subroutine is included in the system, a "total screen" is displayed on the customer monitor, itemizing the items ordered and the total amount due (step 142). At this time customer interaction with the system is completed, and the system no longer accepts input from the customer touch screen.

If any changes are needed after the order is complete, the cashier must initiate these changes. A typical display for a cashier terminal in a routine order filling mode is illustrated in FIG. 8. For example, after the cashier has manipulated the touch screen to cause the proper order to appear on the video receipt, the cashier can manipulate the display touch screen to change the order or cause one of the various menus to be displayed on the cashier monitor. As any desired changes are made to the order by the cashier, the video receipt being displayed on both the customer monitor and the cashier monitor is updated.

In the event the customer tenders a coupon or is eligible for a discount, the system must be able to process this information. Appropriate subroutines are provided for processing the coupon or discount and, if necessary, recalculating the total amount due for the order. Upon selection of one of the coupon or discount boxes (step 152), the processor 12 accesses the appropriate subroutine (step 154). A more complete coupon subroutine is discussed below. The discount is automatically calculated and applied to the order, the video receipt being updated appropriately. If any additional coupon or discount is presented or requested, the subroutine makes sure that the additional coupon or discount is valid with any coupon or discount already taken (step 156). After all changes to the order have been processed, the employee selects the "amount tendered" box, which causes an appropriate screen having numbers to be displayed at the cashier terminal for entry of the amount tendered. Upon entry of this amount, the processor 12 calculates the change due and both the customer monitor (FIG. 9) and the cashier monitor display a final video receipt, which shows the amount tendered and change due (step 158). The cashier then closes out the order, and causes a receipt to be printed by selecting the proper box, if so requested. After a predetermined period of time or upon the cashier's initiation, the customer monitor stops displaying the final video receipt and returns to the "start order" screen (step 160). A new order may then be entered by the next customer.

As noted above, a number of subroutines are used by the present invention, both in the main program and independently therefrom, to assist in the managing operations of the retail establishment. Certain of these will be discussed below.

CUSTOMER ASSISTANCE SUBROUTINE

As discussed above, in order to be effective, a customer self-ordering system must be easy to use and understand so that customers are not intimidated by the system. The system must also be adaptable to conform to the expectations of the customers. In part, this is accomplished by designing a self-teaching user friendly system. However, more is necessary. First, as discussed above, the customer terminals are placed in close proximity to the cashier terminal to which they correspond. This should permit easy access to a store employee by a customer. Second, a cashier may still enter an order for a customer. The system still permits a customer to verbally communicate his or her order to a store employee, as the cashier terminal is capable of having customer orders input to the system directly therethrough. This feature is important for a successful system, because there are customers who do not wish to or cannot effectively use the customer input system.

Figure 10A:
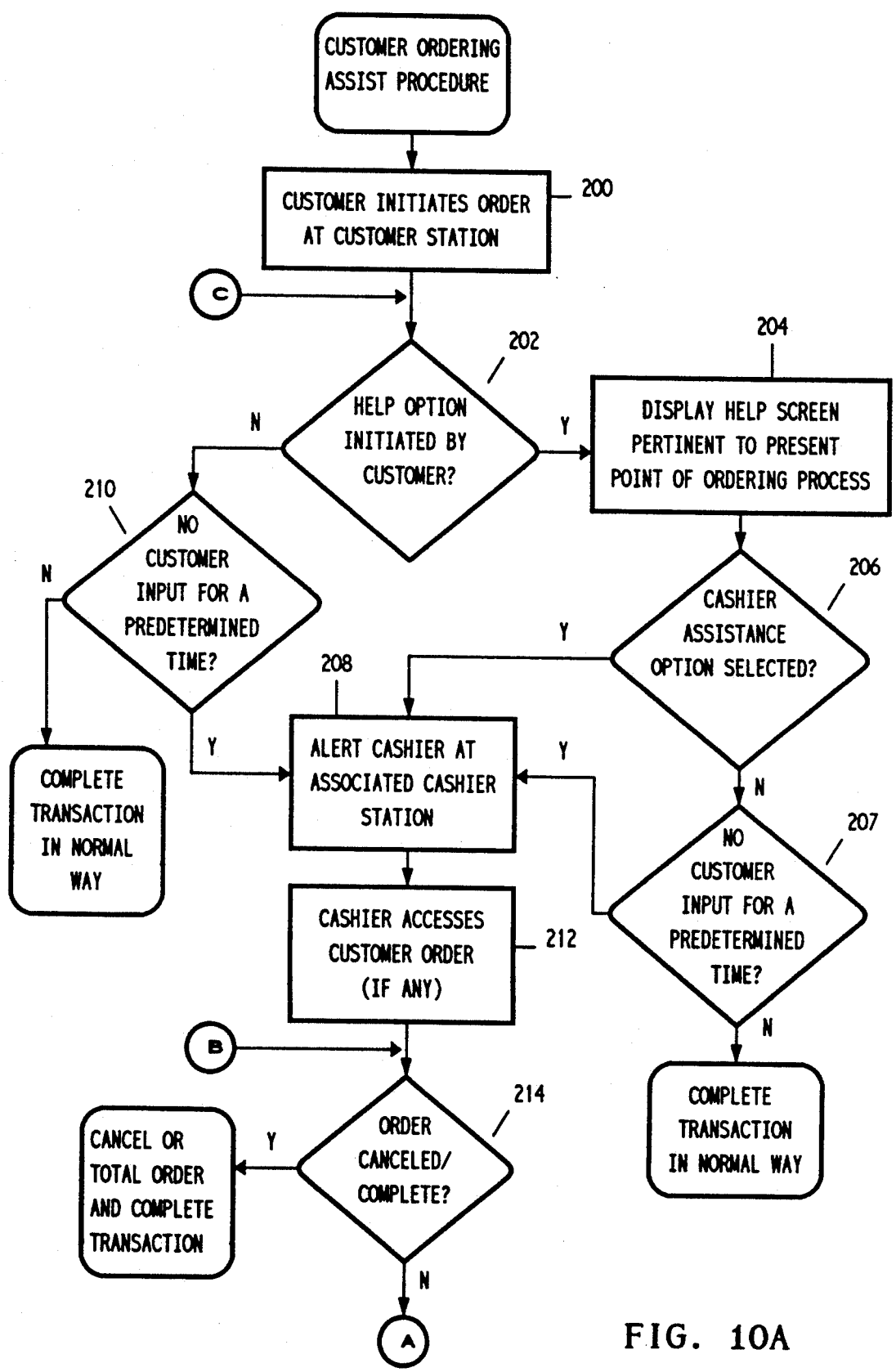
FIGS. 10A and B is a flow chart for a customer assistance subroutine according to the present invention.
Figure 10B:
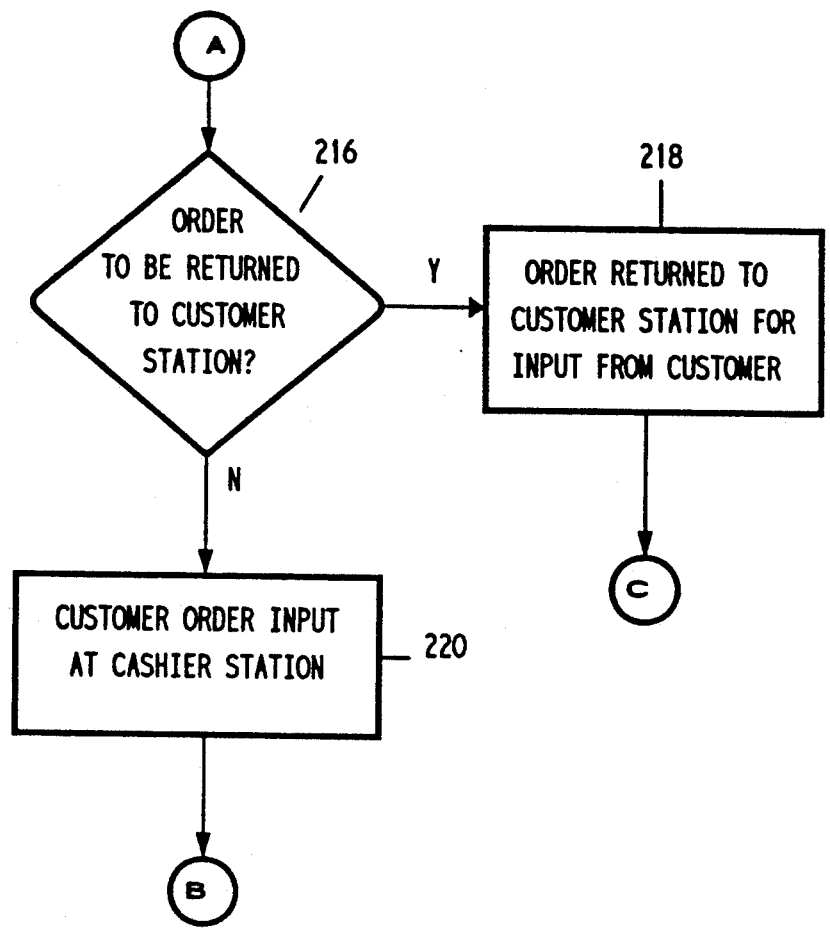

Additionally, as described above, a "help" box is displayed on the customer monitor during the ordering process. Thus, a help subroutine may be accessed during ordering, as illustrated by the flowchart of FIG. 10, 10A. When a customer selects the help box (step 202), the processor 12 causes an informational screen pertinent to the present step being taken by the customer in the ordering process to be displayed (step 204). Information relating to the display screen, which the customer was viewing before selecting the "help" box in step 202, will be displayed, as well as general information regarding how the overall system functions. Also displayed on the help screen are at least "return to order" and "call employee" function boxes. If the customer selects the "return to order" box, the processor 12 will return to the point in the order that existed before the customer selected the help option. By selecting the "call employee" box (step 206), the processor 12 will cause an alert to appear on the cashier monitor (step 208). Optionally, whenever the help screen has been displayed for a predetermined period of time (step 207), indicating that the customer is confused or does not understand the system or the help information, the cashier will also be alerted.

Similarly, if during the ordering process (step 200) the customer does not initiate the help option, but does not input any selections into the customer terminal for a predetermined period of time (step 210), once again indicating the possibility of customer confusion, an alert can be displayed at the corresponding cashier monitor informing the cashier of a possible problem (step 208). Thus, customer assistance can be provided upon customer initiative or lack of customer input to the system. In this way, the overall system is designed to be extremely responsive to the needs of the customer.

Upon the cashier being alerted of a possible problem in step 208, the cashier can optionally access the customer order (step 210). The cashier can communicate verbally with the customer and discover the status of the order. If the order is complete or to be cancelled, the cashier can take the appropriate action at the cashier terminal (step 214). Alternatively, the cashier can determine whether control of the order can be returned to the customer (step 216 of FIG. 10B). Should control of the order be returned to the customer (step 218), the help option is once again available should the customer have any trouble. Alternatively, the cashier can complete the order for the customer (step 220).

SUGGESTIVE SELLING SUBROUTINE

Another important feature of the present invention is the automated suggestive selling aspect. In a traditional fast food environment, after the customer has verbally presented his or her order to a store employee, the store employee is instructed to suggest items to the customer which the customer may not have ordered, such as drinks, desserts, etc. Suggestive selling is performed in order to increase sales and profits, as these items are usually high profit items. Therefore, even if only a relatively small percentage of the suggestive selling pitches are accepted by a customer, the return is high for the amount of time involved suggesting these items. Therefore, it will be preferable to include some type of suggestive selling subroutine into any point of sale system.

Figure 11:
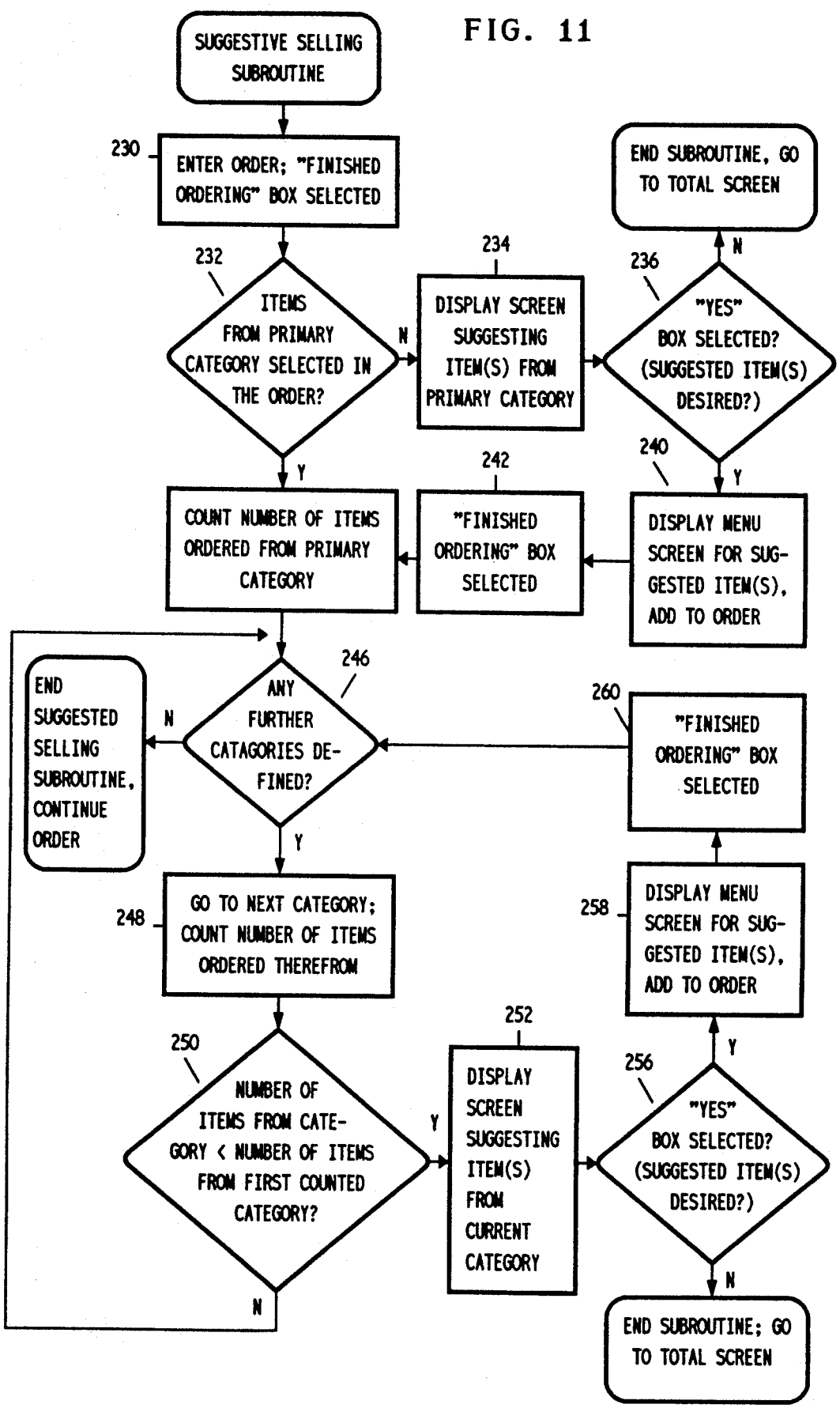
FIG. 11 is a flow chart for a suggestive selling subroutine according to the present invention.

A method by which suggestive selling has been incorporated in the present invention is explained with reference to FIG. 11.

Figure 12:
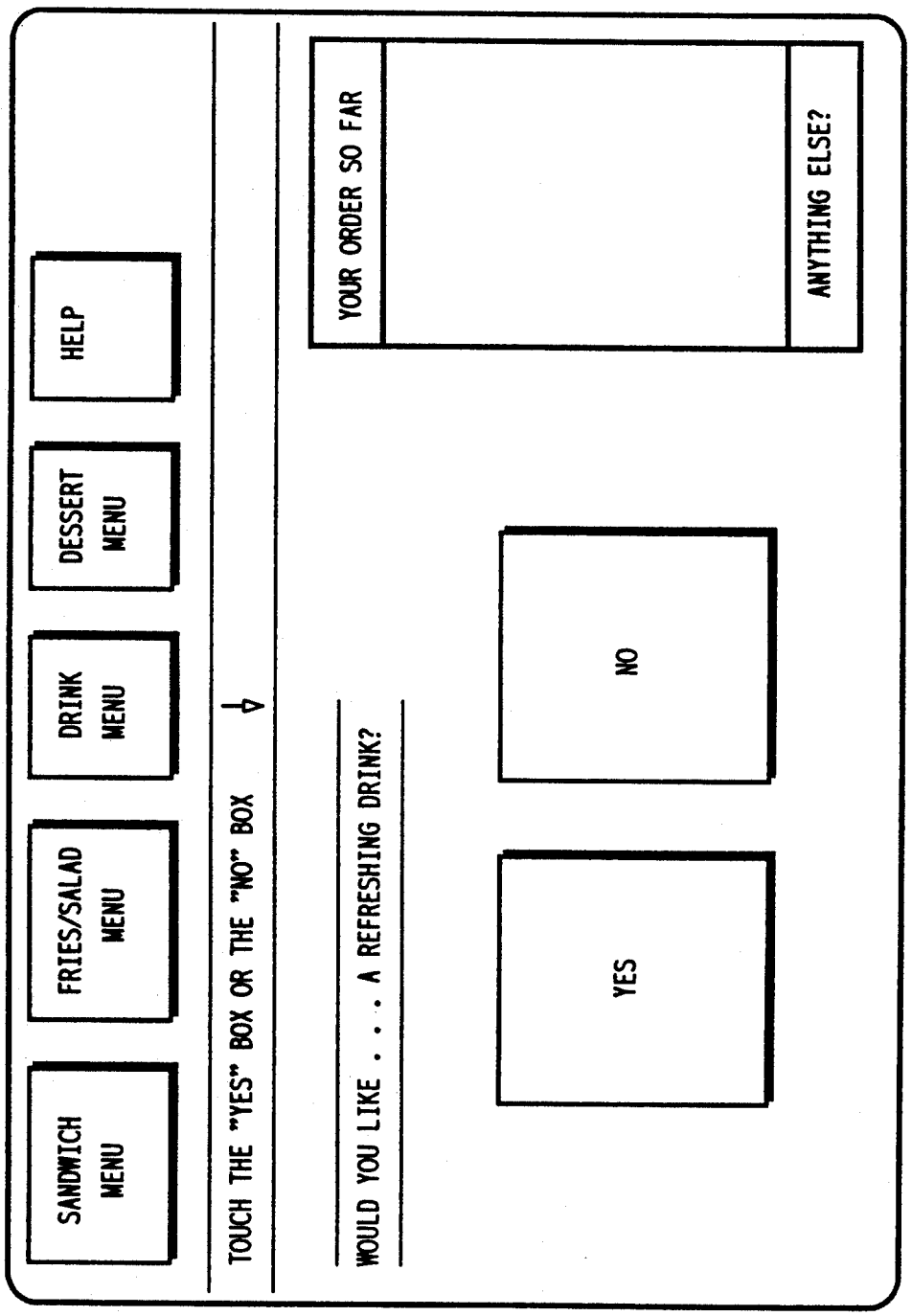
FIG. 12 illustrates a suggestive selling screen for display on the customer terminal.

When the customer finishes inputting his or her order, the customer selects the "finished ordering" box on the touch screen (step 230). Instead of immediately calculating the total amount of the order, the processor 12 accesses a suggestive selling subroutine. In step 232, the processor 12 determines if any items were selected from a primary category. Usually, this primary category includes items for which it is expected that one item for each person in the customer's party will be selected, such as main dishes. A typical suggestive selling screen is illustrated in FIG. 12. The customer is asked to select a "yes" or "no" box when queried as to whether he or she would like the item being suggested for ordering.

Should the customer select the "no" box, the suggestive selling subroutine ends, and the processor 12 displays the "total" screen discussed above on the customer monitor, which shows the items ordered by the customer, their respective prices, and the total amount. This corresponds to step 142 of the main flow chart of FIG. 4C.

On the other hand, if the customer selects the "yes" box, the menu corresponding to the suggested category is displayed on the customer monitor so that the customer can make additional choices from that category. The customer is also able to add items from other categories by properly manipulating the boxes on the touch screen.

When the customer once again inputs the "finished ordering" box (step 242) after viewing the menu screen(s), the number of items finally ordered from the primary category is counted (step 244). Step 244 is also performed if items were found to be originally selected from the primary category in step 232.

The suggestive selling subroutine can be disabled altogether. However, if it is used, there is usually at least one secondary suggestive selling category defined. In the fast food industry, a first order secondary category is usually drinks, as drinks are one of the most profitable items. In step 246, the processor 12 checks to see if any such additional categories have been defined. If no secondary categories are defined, the processor 12 ends the suggestive selling subroutine and proceeds to the total screen, as described above. If additional categories have been defined, the processor 12 counts the number of items chosen from this first order secondary category (step 248). If it is determined in step 250 that the number of items selected from the first order secondary category is not less than the number of items selected from the primary category, the first order secondary category will not be suggested to the customer, and the processor 12 will return to step 246 to investigate if any further secondary categories are defined. If the number of items from the first order secondary category is fewer than the number of items ordered from the primary category, then a suggestive selling screen for items in the first order secondary category is displayed (step 252). If the "yes" box is not selected from the suggestive selling screen (step 256), the processor 12 exits the suggestive selling subroutine, totals the order and displays the total screen. If the customer selects the "yes" box, the menu screen for that category will be displayed (step 258) and the customer can continue ordering. When the customer again selects the "finished" ordering box (step 260), the processor 12 will return to step 246 to check if any further categories are defined, and repeat steps 248 through 260 as necessary.

Certain limitations can be placed on the suggestive selling subroutine. For example, a limit may be placed on the number of items suggestively sold. Additionally, once the customer has selected a suggested item, the subroutine may end. At any time the subroutine may be disabled or the categories to be suggested or their order of importance can be changed.

SPECIAL ORDER SUBROUTINE

Figure 13:
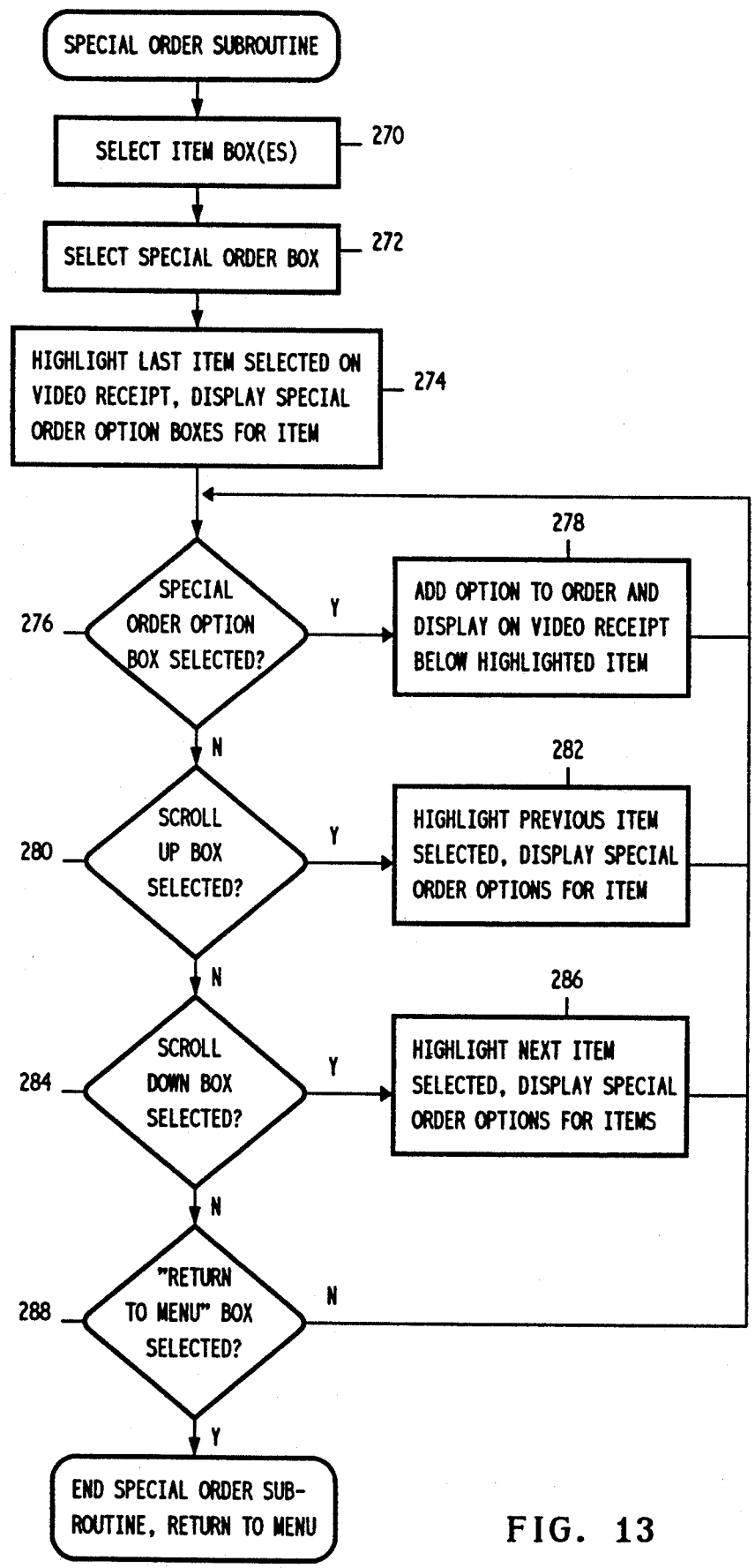
FIG. 13 is a flow chart for a special order subroutine according to the present invention.

A flow chart for a special order subroutine is illustrated in FIG. 13. The special order subroutine can be entered out of the main subroutine by the customer, or, if special orders are not to be encouraged, can be entered only by a cashier at the cashier terminal. This special order subroutine is extremely flexible, and can be used at any time during the ordering.

After the customer has selected at least one item from one of the menus during the running of the main program of FIGS. 4A-4C, the special order box can be selected (step 272). Upon selection, the last item selected, which is normally the last item listed on the video receipt, is highlighted, and special order options for that item are displayed on the display screen next to the video receipt (step 274). The display includes boxes which indicate special order options, such as extra ketchup, no ketchup, lettuce, tomatoes, mayonnaise, etc. If the customer selects one of the special order option boxes (step 276), that option is added to the video receipt below the corresponding item, and any additional cost is also indicated and added to the running total (step 278). Whether or not the customer (or employee) selects one of the special order option box in step 276, the special order screen remains displayed. Should a special order be desired for an item which was selected prior to the last item, the customer (or employee) may select a "scroll up" box (step 280), which causes the item above the highlighted item on the video receipt to now become highlighted and a video screen displayed having special options for the newly highlighted item (step 282). A "scroll down" box is available for scrolling down if items appear below the presently highlighted item on the video receipt (steps 284 and 286). The customer (or employee) may return to the menu screen by selecting a "return to menu" box (step 288). When this box is finally selected, the special order subroutine is ended, and the processor 12 returns to the main program.

A cancel item subroutine is not illustrated, but is very similar to the special order subroutine. The cancel item subroutine is accessed from a menu screen, and the customer is given the options of deleting the highlighted item from the video receipt, scrolling up or down the video receipt, or return to the menu screen. Alternatively, a cancel item subroutine can be implemented which is much simpler. Usually, a customer will want to delete only the last item selected. Thus, the subroutine can be such that when the cancel item box is selected, only the last item ordered is cancelled. Of course, if the customer would want to delete an earlier item, he or she would have to keep selecting the cancel item box until the proper item is deleted (as would be apparent from the video receipt), and then reenter the other deleted items.

COUPON SUBROUTINE

Figure 14:
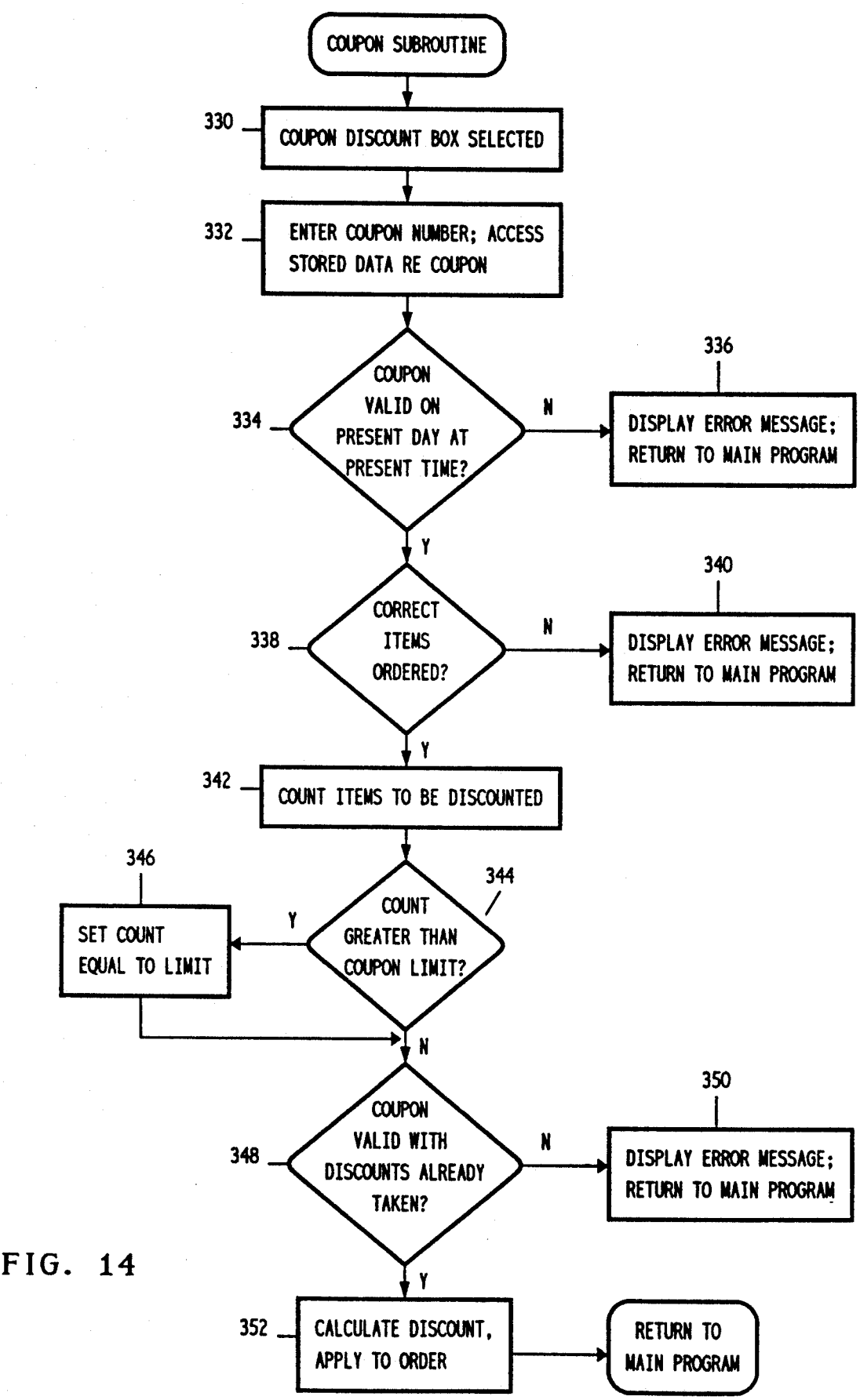
FIG. 14 is a flow chart for a coupon discount subroutine according to the present invention.

FIG. 14 illustrates a subroutine to be accessed if a customer presents a coupon to the cashier. The processor 12 is able to process a wide variety of coupons, such as cents off coupons, two-for-one coupons, buy one get one free coupons, etc. The processor 12 automatically checks if there is a coupon limit on the number of items for which a coupon can be applied, or if the coupon is valid at the time it is presented, or if the coupon is valid with any other type of discount already taken. A typical subroutine for a coupon is discussed below.

When presented with a coupon, the cashier selects a "coupon discount" box on the cashier terminal (step 330). At this time, the processor 12 displays a query on the cashier terminal for a coupon number. If available, the cashier may use the bar code scanner to scan a bar code on the coupon, or enter a coupon number which may be printed on the coupon or noted on a coupon list, separate from the computer, provided to the cashier. When the coupon is finally identified, the processor 12 accesses stored coupon data for the coupon (step 332). The processor 12 checks whether the coupon has expired, whether the coupon is valid on the present day, and whether the coupon is valid at the present time of day (step 334). If not, an error message is displayed, and the processor 12 will return to the main program (step 336). Alternatively, an override may be built into the system which allows the discount provided on the coupon to be entered at the discretion of the cashier, or at the discretion of the manager (by requiring that the manager enter a code to override the rejection of the coupon). The processor 12 then checks to see if items for which the coupon is valid have been ordered (step 338). If not, an error message is displayed and the processor 12 returns to the main program (step 340). If an item for which the coupon is valid has been selected, the number of correct items is counted (step 342). If, for example, the coupon provides for a discount on roast beef sandwiches up to a maximum of four roast beef sandwiches, but six roast beef sandwiches have been selected by the customer (and counted in step 342), the "count" will be changed from six to four (the coupon limit), so that a discount will only be given on four of the six roast beef sandwiches in the order (steps 344, 346). In step 348, the processor 12 checks to see if a discount on the roast beef sandwiches is valid with any other discounts already taken. If not, an error message will be displayed and the processor will cause the coupon subroutine to end and return to the main program (step 350). If no other discount has been taken or if the present coupon is valid with a discount already taken, the discount will be calculated, applied to the order and displayed on the video receipt (step 352). The processor 12 then returns to the main program.

Similar subroutines are used for dollar discounts and percentage discounts. Like the coupon subroutine, these subroutines can be accessed by the cashier selecting the appropriate box on the cashier screen of FIG. 8, and can require manager approval.

SKIMMING SUBROUTINES

Figure 15:
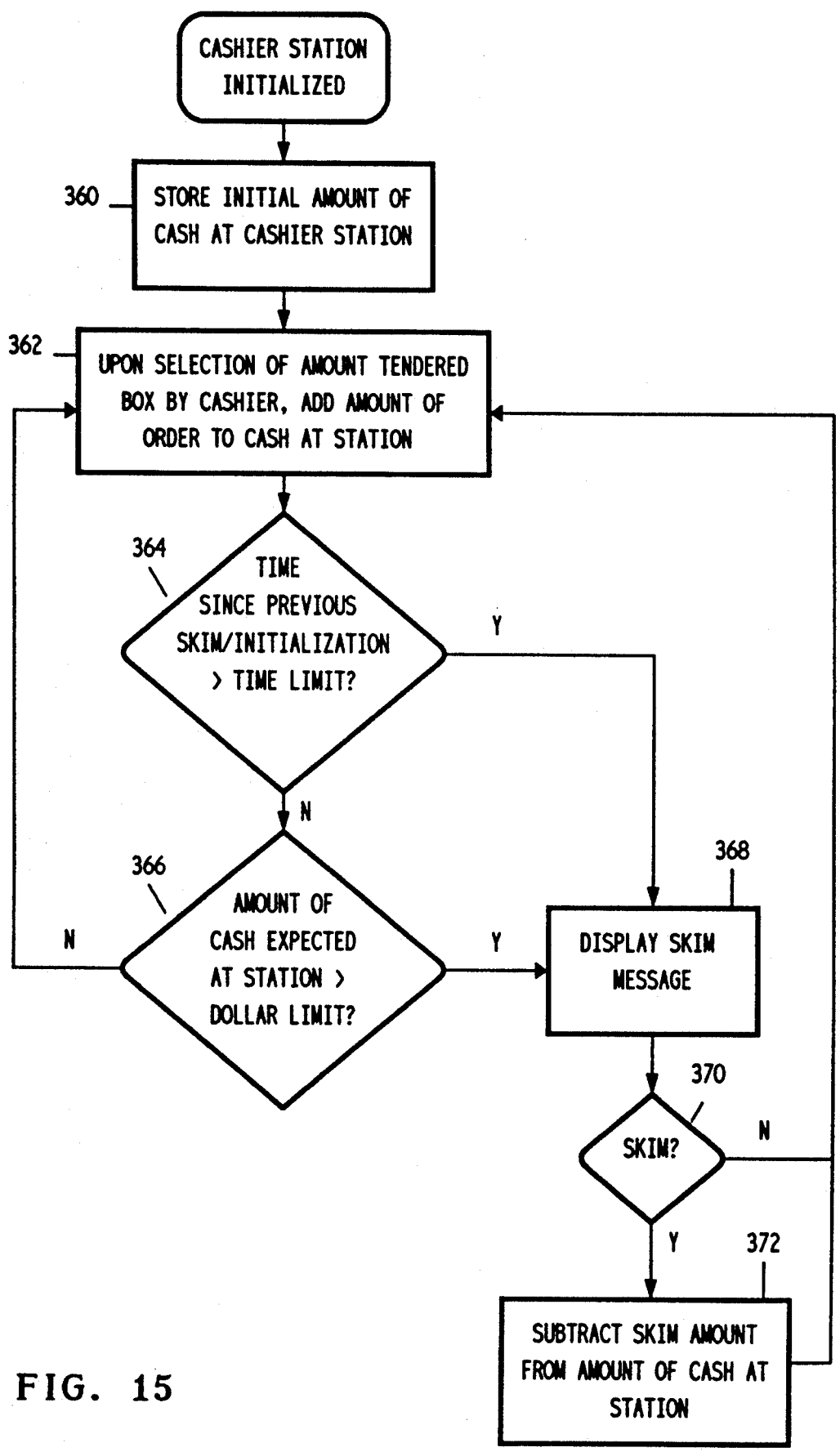
FIG. 15 is a flow chart for a subroutine for alerting management personnel of the need for a cash drawer skim according to the present invention.

Additionally, the system is designed so as to assist store managers with their jobs. One such manager function with which the present invention is involved is "skimming", a flow chart for which is illustrated in FIG. 15. Money is skimmed from cash registers in order to prevent too much cash from building up at the cash register, which is a vulnerable position in terms of theft. Ideally, the amount of money to be kept on hand at the cash register is the amount initially placed in the cash register at the beginning of a shift or day, which provides for change.

Accordingly, in an ongoing subroutine, this initial amount is stored by the processor 12 (step 360). Upon selection of the amount tendered box by the cashier after the entry of each order, the amount of the order is added to the stored amount, and this new amount is stored (step 362). The system can call for a skim at this time for one of two reasons. The system may call for a manager's skim after a passage of a predetermined period of time, or when a certain amount of cash has built upon the cash drawer. Thus, when the "amount tendered" box is entered and the predetermined period of time has passed since the previous skim or the initialization of the cashier terminal (step 364), or the stored amount of cash expected to be at the station is greater than a predetermined dollar limit (step 366), a skim message is displayed on the cashier monitor (step 368). If a manager work station is provided in the system, this message may also be displayed at the manager workstation so as to inform him. The message displayed at either the cashier terminal or the manager workstation may or may not include an amount to be skimmed from the cash drawer. The message to the cashier can be either informative or annoying in nature to catch the cashier's attention, so that the cashier will inform the manager that a skim is necessary as soon as possible. The skim message can be set to expire after a predetermined period of time, or can be terminated by the cashier by selection of a box on the cashier terminal and may tell the manager how much cash should be skimmed. The skim message will reappear each subsequent time the "amount tendered" box is selected by the cashier if no skim is performed after the message is initially displayed, and the amount of each subsequent order added to the running total. If a skim is performed (step 370), the manager inputs the amount of money skimmed from the cash drawer. The amount of money skimmed is subtracted from the running total, and the time period restarted in anticipation of the next skim.

Figure 16:
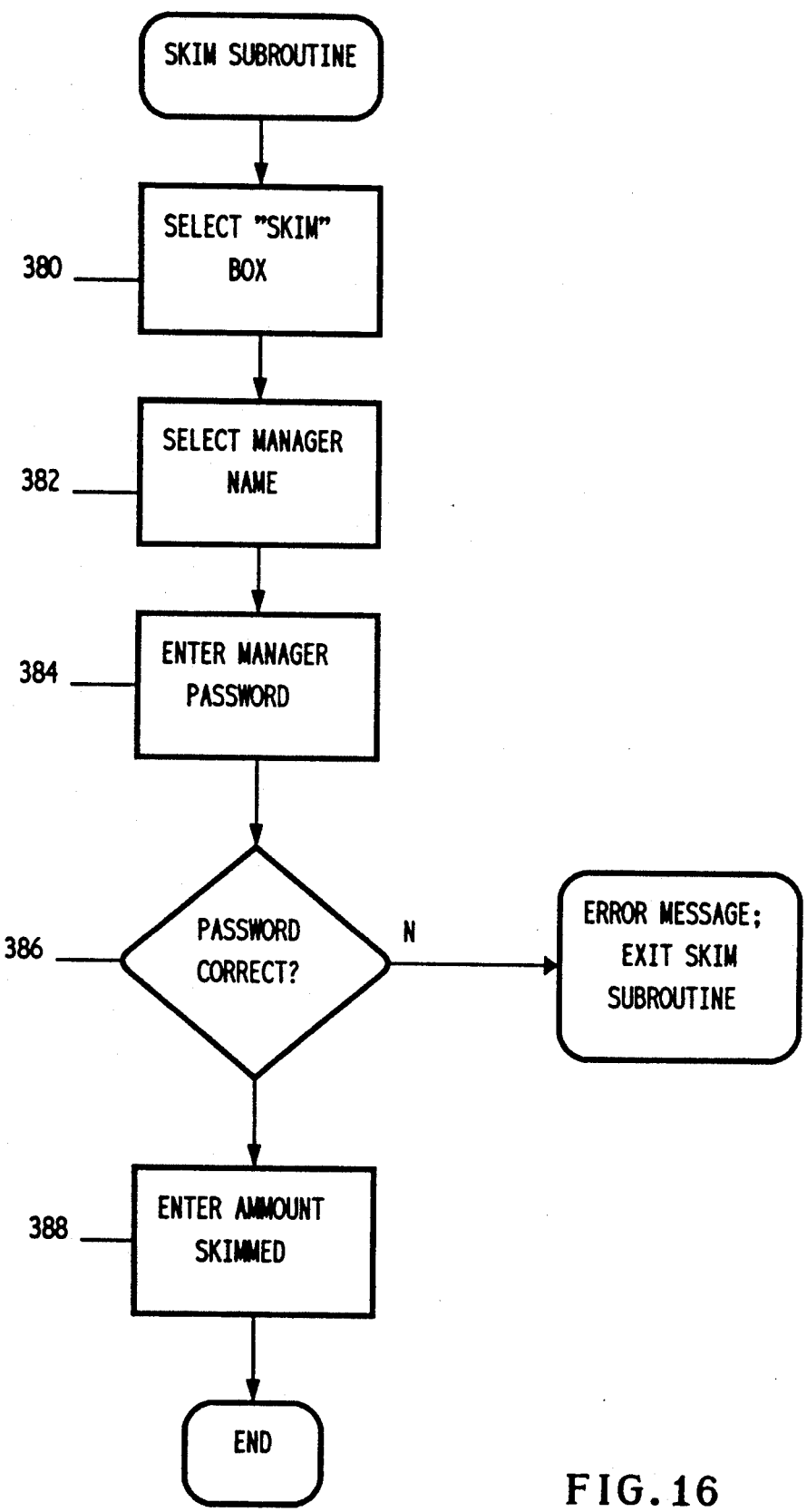
FIG. 16 is a flow chart for a skim subroutine.
Figure 17A:
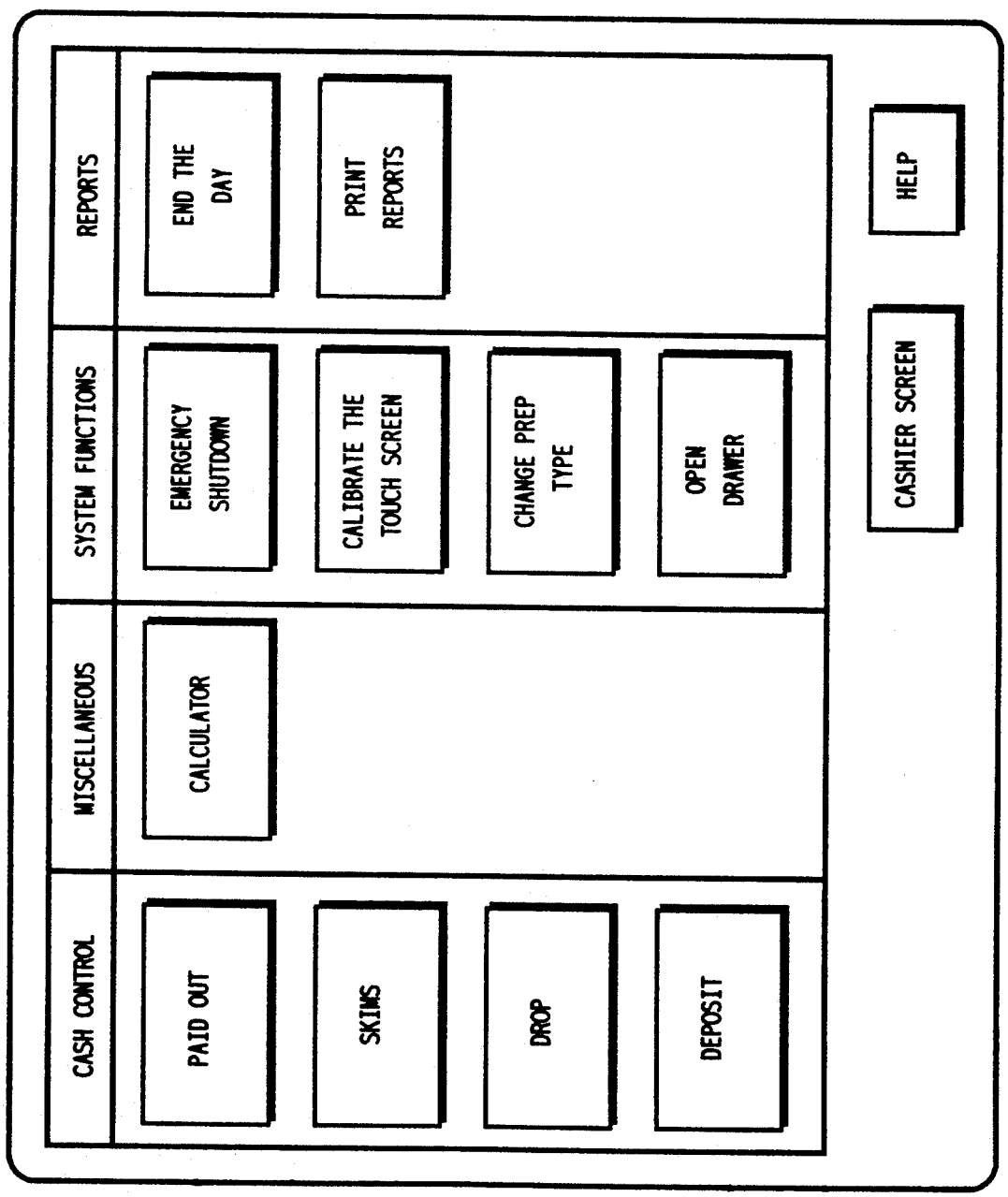
FIG. 17A illustrates a manager control screen for display on the cashier monitor.
Figure 17B:
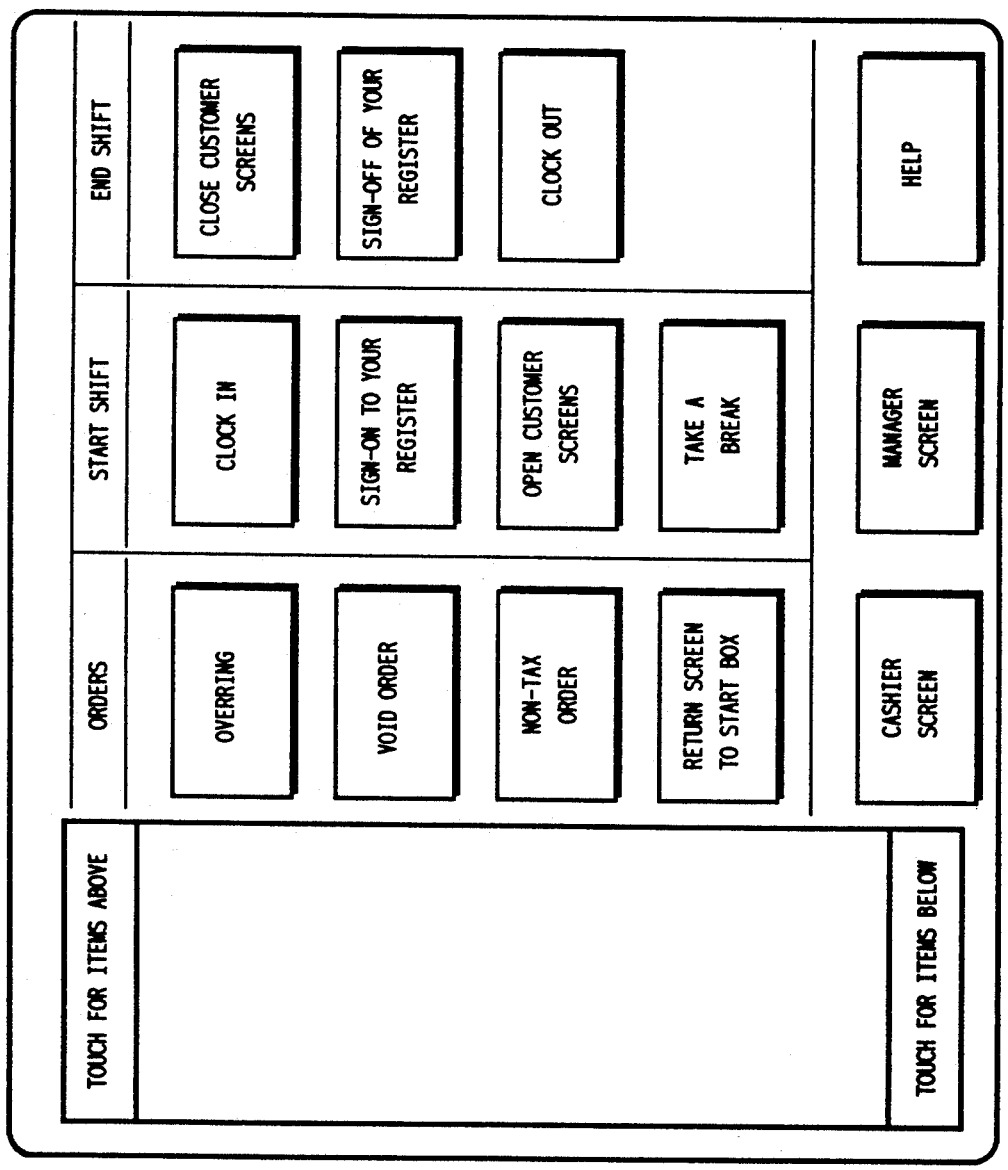
FIG. 17B illustrates a cashier control screen for display on the cashier monitor.
Figure 18A:
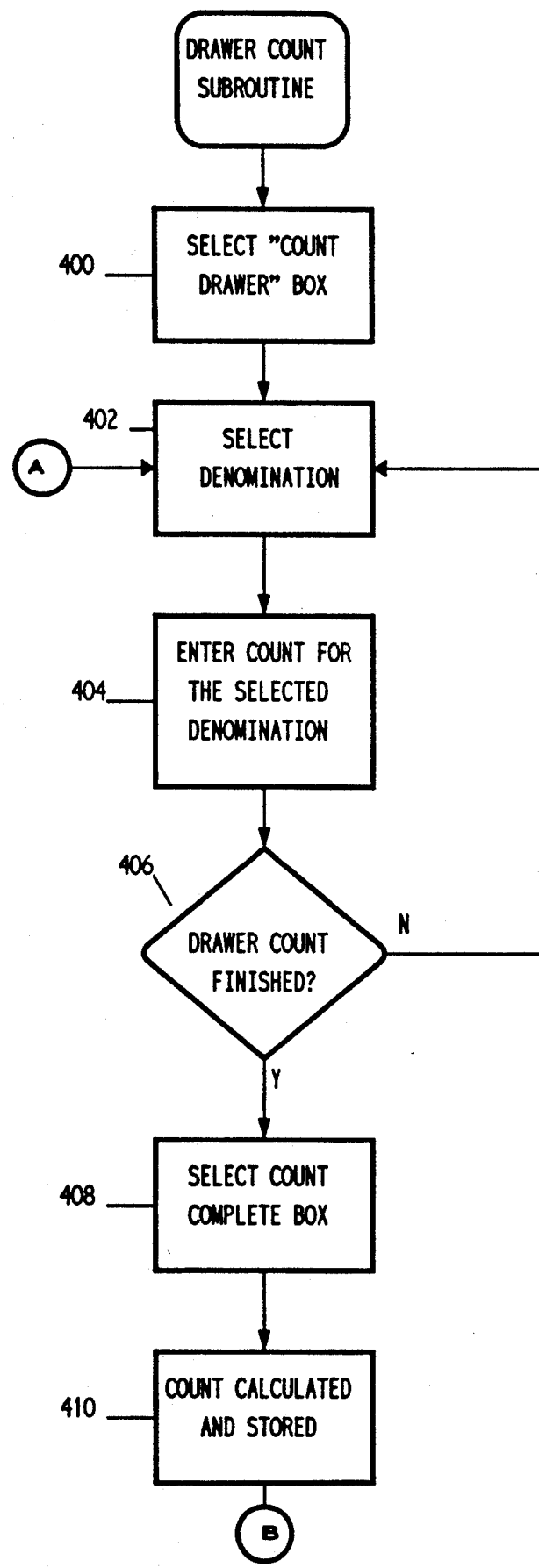
FIGS. 18A and B are a flow chart for a drawer count subroutine according to the present invention.
Figure 18B:
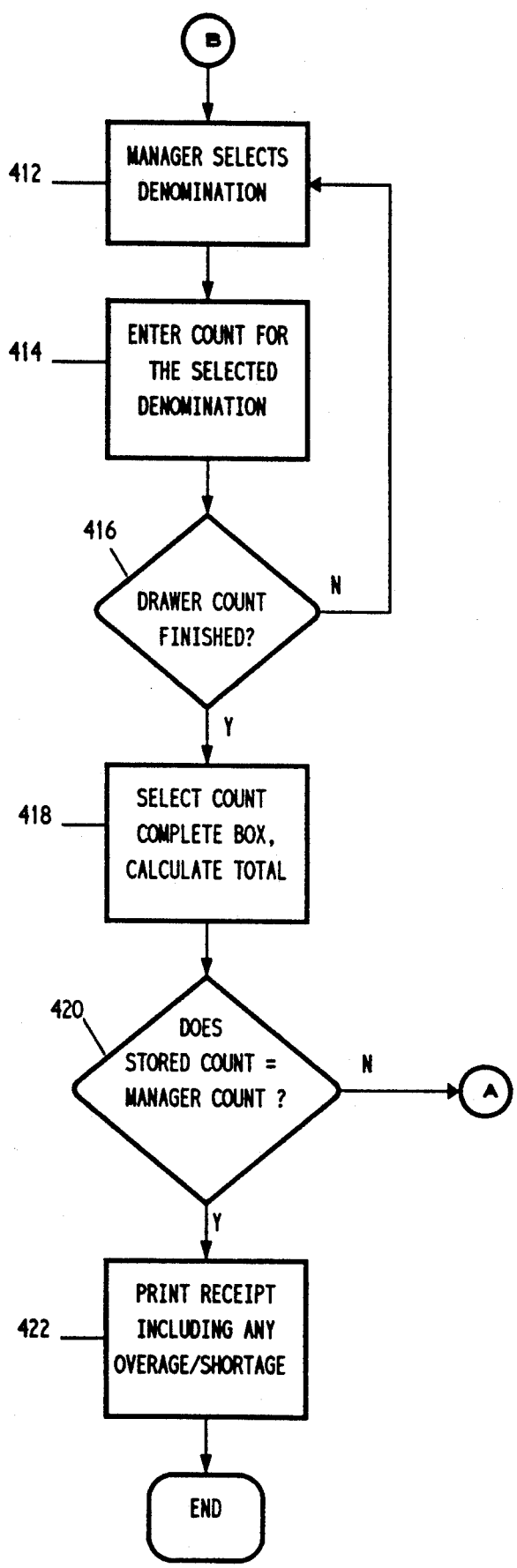

A flowchart for an actual skim is illustrated in FIG. 16. Upon being informed that a skim is necessary or should the manager decide to skim a cash drawer, the manager manipulates the cashier terminal such that a control screen which includes a skim box is displayed. Examples of such control screens are illustrated in FIGS. 17A-17B. Upon selection of the skim box (step 380) from the control display, a safeguard procedure is started. A screen is next displayed on the cashier monitor which lists the names of active managers. The manager selects his or her name from the screen (step 382), and then must enter his or her password or code (step 384). If the password is found to be correct (step 386), the manager uses a displayed key pad to enter the amount being skimmed from the cash drawer (step 388). If the password is incorrect, an error message is displayed and the processor 12 exits from the manager skim subroutine.

DRAWER COUNT SUBROUTINE

The present invention also provides a simplified method for counting the drawer at the end of a day or cashier's shift. Upon the end of a employee's shift or the end of a day, the cashier manipulates the touch screen so that the control display screen is displayed at the cashier monitor. By selecting the "count drawer" box (step 400), the processor 12 accesses the drawer count subroutine for this cluster. Displayed on the cashier monitor are denomination boxes and key pad. Very simply, the cashier selects one of the denomination boxes (step 402). The processor 12 then displays on the cashier monitor a request that the cashier enter the quantity of the selected denomination (pennies, nickels, dimes, quarters, dollar bills, etc.) that are in the cash drawer. So, rather than count and multiply, the cashier uses the key pad to enter the number of the selected denomination present in the cash drawer (step 404). Upon completion of the entry of the present number of the selected denomination, if the drawer count is not finished, the cashier selects another denomination for which a count is to be entered (step 402). When all the denominations present in the drawer have been counted, the cashier enters the "drawer count finished" box (step 408). The processor 12 then calculates the amount of money in the cash drawer by multiplying the denomination counts by the value of each denomination and adding the results together and stores the count.

As illustrated in FIG. 15B, the manager then repeats the drawer count process performed by the cashier (steps 412 through 418). When the manager has indicated that the drawer count is complete, the processor 12 calculates the drawer count as entered by the manager, and compares the stored cashier count to the manager count (step 420). If the amounts do not match, the process is started over beginning with step 402, and is repeated until the manager count and the cashier count match. When the counts are finally found to match in step 420, a receipt is printed which indicates any drawer shortage or overage in comparison to the expected amount of money in the cash drawer (step 422).

DROP SUBROUTINE

Figure 19:
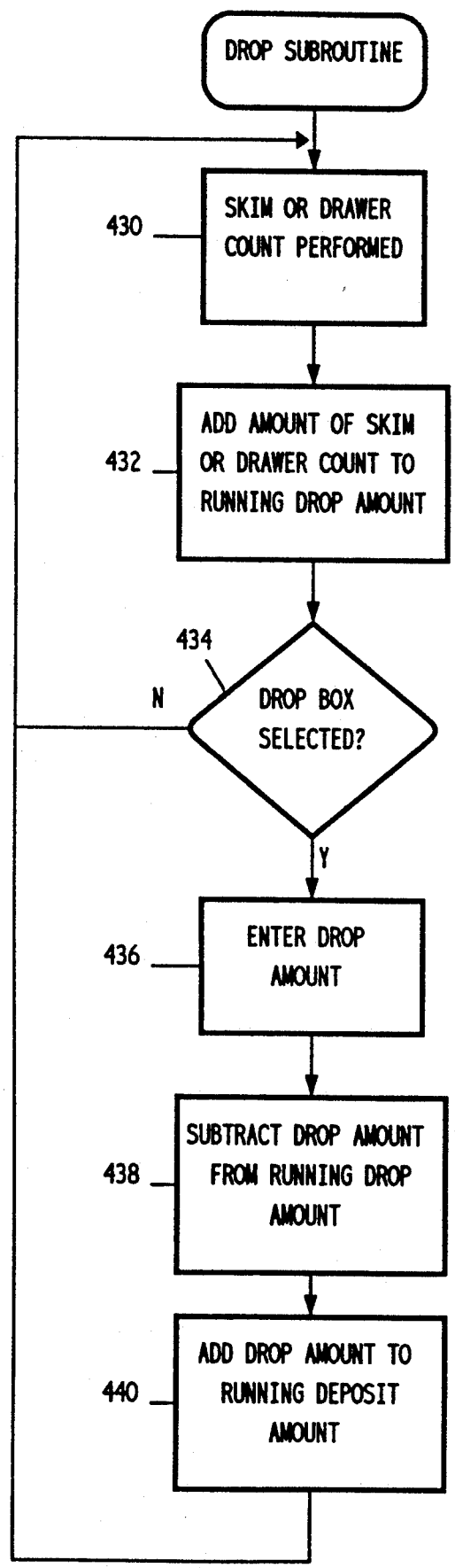
FIG. 19 is a flow chart for a drop subroutine according to the present invention.

Another manager assistance tool is the "drop" subroutine, as illustrated in the flow chart of FIG. 19. The drop subroutine is related to the skim subroutine and the drawer count subroutine, in that every time a skim or a drawer count is performed, the skim or drawer count is added to a running drop total (steps 430, 432). The drop subroutine is actually entered when the manager selects a "drop" box from the control screen (step 434). This portion of the control screen can be displayed on any or all of the cashier terminal, the consolidator terminal, and the manager workstation terminal, depending on the configuration.

Generally speaking, a "drop" is the placement of cash into a store safe for inclusion in a future deposit to a bank. Accordingly, there are many factors which the manager must weigh before deciding how much money he or she would like to include in the drop, such as the need for change, any upcoming cash expenditures, etc. Accordingly, after selecting the drop option, the manager enters the amount to be dropped (step 436). The processor 12 can cause the running drop amount to be displayed, together with each individual addition to the running drop amount since the last drop occurred. The manager enters the amount of cash he or she decides to drop into the safe (step 436) and this entered amount is subtracted from the running drop amount (step 438). The amount of the drop is added to a running deposit amount (step 440), which will be explained below. Each subsequent skim or drawer count is added to the new drop amount, in anticipation of the next drop.

DEPOSIT SUBROUTINE

Figure 20:
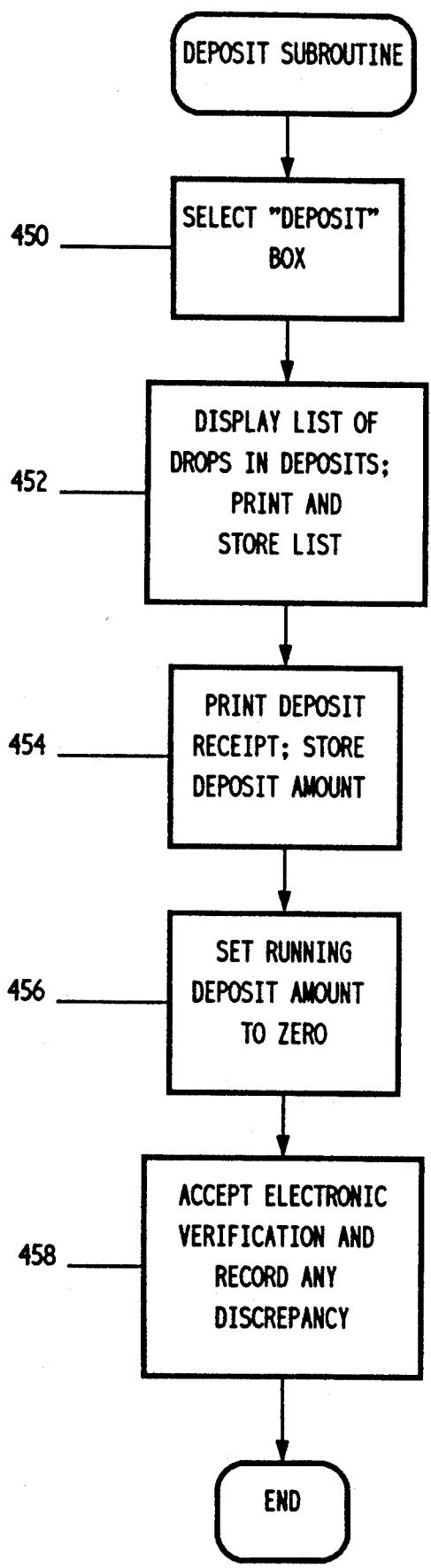
FIG. 20 is a flow chart for a deposit subroutine according to the present invention.

A deposit subroutine flow chart is illustrated in FIG. 20. Like the drop subroutine, the manager must select the "deposit" box from the control screen (step 450), which may be displayed at any terminal. The subroutine may include a security function like those described above for other subroutines. The security function includes the display of a screen having the names of all the managers, selection of the appropriate manager box, and input of a password or secret code. Thereafter, in step 452, a list of drops since the last deposit and the total of the present deposit are displayed. This information is then stored and an appropriate deposit receipt printed (step 454). In step 456, the deposit amount is returned to zero. If the system is equipped to accept electronic verification from the bank or deposit institute, a further step includes the acceptance of the electronic verification and the recording of any discrepancy between the recorded deposit amount and the verified deposit amount (step 458). This safeguard insures immediate detection of errors and provides an extra level of security.

PAID OUTS SUBROUTINE

Figure 21:
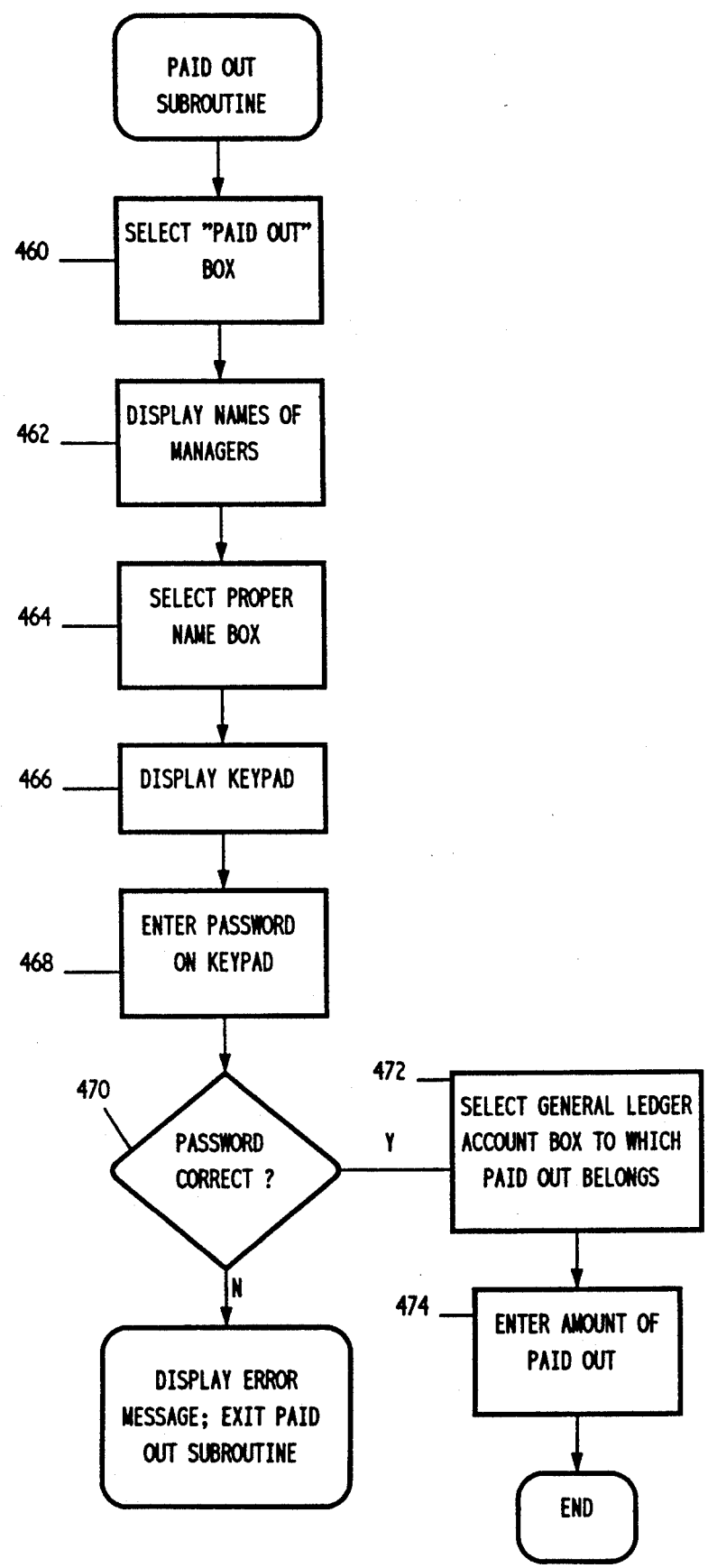
FIG. 21 is a flow chart for a paid outs subroutine according to the present invention.

FIG. 21 illustrates a flow chart for "paid outs" A "paid out" is a cash expenditure from a retail outlet. By providing an automatic system for recording paid outs, many accounting problems can be alleviated, as the expenditure is automatically recorded. To initiate the paid out subroutine, the manager manipulates one of the touch screens so that the control screen is displayed, and selects the "paid out" box from the control screen (step 460). Since a cash expenditure is being authorized, a manager security function will usually be mandatory. Therefore, a screen having names of all store managers is displayed (step 462), from which the manager must select the box corresponding to his or her name (step 464) and then enter the appropriate password or code on a keypad on the monitor (steps 466 and 468). If the password is determined to be incorrect in step 470 an error message is displayed and the paid out subroutine is exited. If the password is determined to be correct, a screen displaying ledger accounts to which the paid out may be categorized is displayed. The manager then selects the appropriate ledger account (step 472) and enters the amount of the paid out (step 474). This paid out data is recorded for use in balancing the accounting books for the store.

A variety of subroutines directed to customer service may also be integrated into the system. Two such subroutines, both directed to group ordering, are discussed below.

Group ordering is particularly useful in fast food restaurants, where one person may want to pay for an entire bus load of students or tour group, or a large family, etc.

GROUP ORDERING SUBROUTINES

Figure 22:
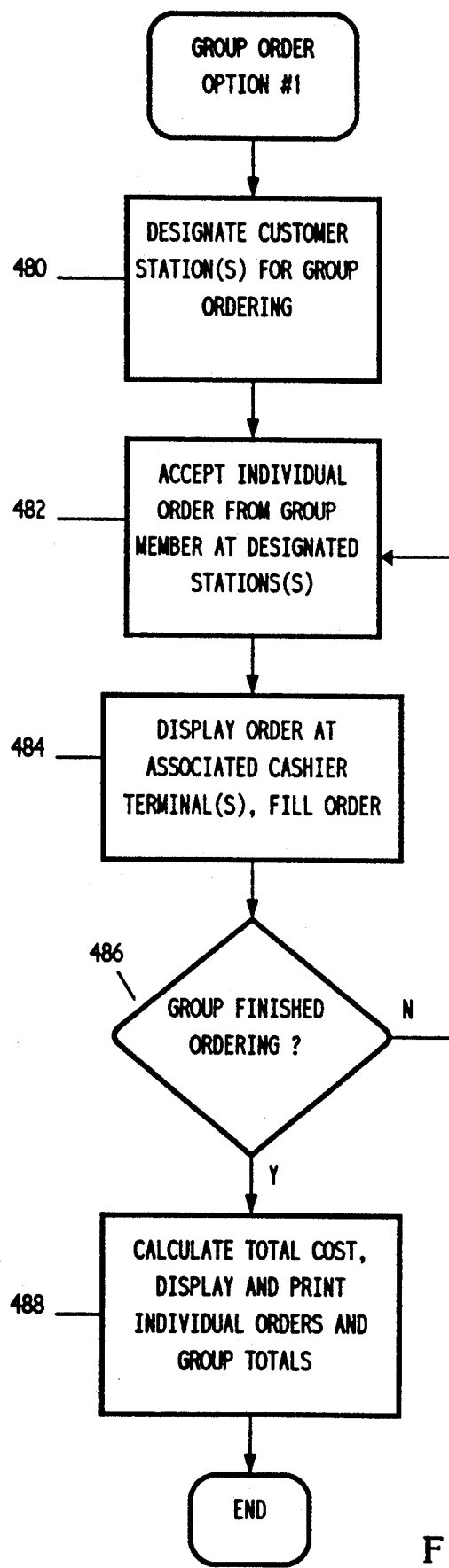
FIG. 22 is a flow chart for a first group ordering subroutine according to the present invention.

A flow chart for one type of group ordering is illustrated in FIG. 22. In this type of group ordering, certain ones of the customer terminals in a cluster or all of the customer terminals for a particular cluster are designated for group ordering by a particular group of customers (step 480). Only members of the group are permitted to order from these customer terminals (step 482). The procedure followed for ordering for each group member is identical to that for normal ordering from the main program, except that the individual customers do not pay. Each order is displayed at the corresponding cashier terminal (step 484), and it is filled in the routine way. The processor 12 accumulates the data pertaining to each individual order. Individual orders are accepted at the designated customer terminal(s) until it is determined that all the members of the groups have ordered (step 486). The processor 12 then calculates the total cost, displays the same to both the cashier and the paying member of the group, and can print a receipt containing each individual order as well as the group totals (step 488).

Figure 23:
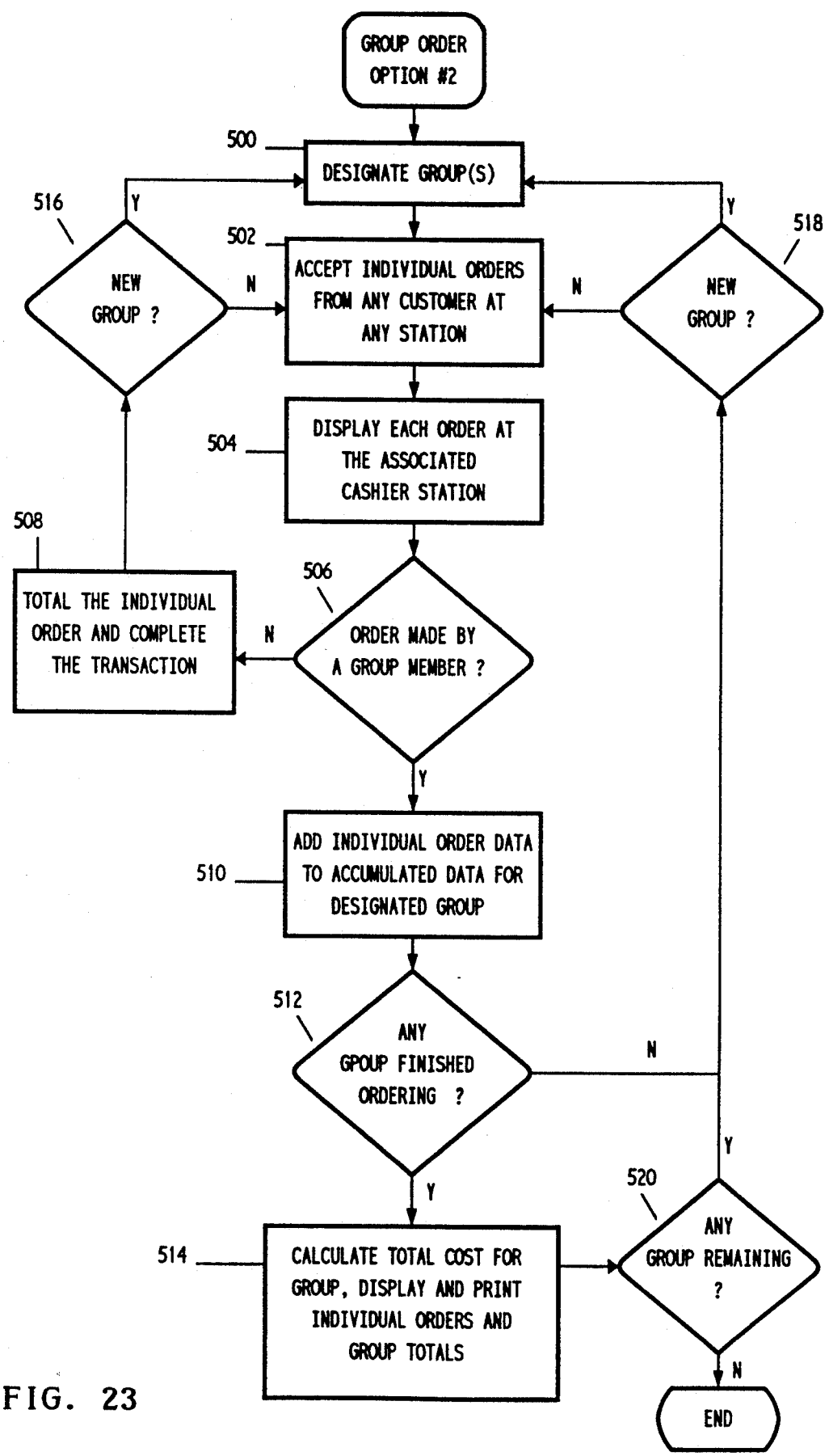
FIG. 23 is a flow chart for a second group ordering subroutine according to the present invention.

A flowchart for a second group ordering subroutine is illustrated in FIG. 23. For this method to be operative, the system should include a consolidator, as this method provides the flexibility of allowing individual members of the group to order from any customer terminal. The consolidator is necessary to collect order data from the various clusters. Further, more than one group at a time may order.

In the second group ordering method, a cashier or manager must input into the system that a group is present. This accomplished by manipulation of a touch screen at one of the cashier terminals (step 500). Then, as individual orders are input to any customer terminal and each order is displayed and filled at the associated cashier terminal (steps 502 and 504), the individual group members must inform the cashier that the order is part of the group order at the time the customer would normally pay (step 506). If the customer is not a member of the group, the transaction is completed in the usual way (step 508). If the customer is a member of the group, no money is collected from the customer, and the customer's order data is added to accumulated group data for the group (step 510). Group data is accumulated until it is determined that all the members of the group have finished ordering (step 512). The group totals are then calculated for the group (step 514) in a manner similar to that for the first group ordering method, and payment is received from the paying member of the group.

In addition, more than one group may be accommodated at a time. In step 500, multiple groups can be designated when the group ordering option is first initiated. Alternatively, as indicated by steps 516 and 518, new groups can be designated while other groups are being accommodated. After each group is paid for, and the processor 12 determines whether any further groups remain (step 520). If no further groups remain, the second group ordering subroutine ends.

While several embodiments of the invention have been discussed, it will be appreciated by those skilled in the art that various modifications and variations of the present invention are possible. For example, the main operating program and subroutines can be adjusted depending on the retail environment, as can the exact configuration of the hardware. Such modifications do not depart from the spirit and scope of the invention.

We claim:

1. An apparatus for customer self-ordering, comprising:
    a customer terminal having a display screen with display information being shown on said display screen for the customer to utilize in making an order, said display information relating to food items to be ordered and including first information, second information and third information, said first information including:

(a) first food indicia representing a plurality of solid food items including sandwiches, whereby the customer is able to select at least a first of said solid food items using said first food indicia;

(b) at least a first menu being represented by a first menu indicia and a second menu being represented by a second menu indicia, said first menu indicia representing a first of one of the following food item categories; fries, salads, drinks and desserts, and said second menu indicia representing a second of one of said food item categories that is different from said firs food item category, each of said first menu indicia and said second menu indicia being selectable by a customer, wherein when said first menu indicia is selected, said display screen displays said second information and when said second menu indicia is selected, said display screen displays said third information including food items of said second food item category, wherein said first information does not include indicia for selecting food items of said first and second food item categories and with said first food indicia, said first menu indicia and said second menu indicia being displayed simultaneously on said display screen;

said second information being displayed on said display screen at a time separately from said first information, said second information including:

(c) second food indicia representing a plurality of food items of said first food item category, different from said solid food items of said first information and food items of said second food category, said second food indicia being selectable by the customer to order a food item of said first food item category; and (d) at least a third menu being represented by a third menu indicia and said second menu indicia, each of said third menu indicia and said second menu indicia being selectable by a customer, wherein when said third menu indicia is selected, said display screen displays said first information and, when said second menu indicia is selected, said display screen displays said third information including food items of said second food item category, wherein said second information does not include indicia for selecting said solid food items and food items of said second food item category and with said second food indicia, said second menu indicia and said third menu indicia being simultaneously displayed on said display screen.

2. An apparatus, as claimed in claim 1, wherein:
said first information further includes a plurality of indicia representing functions that are implemented upon selection, said plurality of indicia representing each of the following selectable functions: canceling a food item previously ordered, indicating that ordering is finished and requesting help by the customer, including help from the cashier, and continuing with the self-ordering.

3. An apparatus, as claimed in claim 1, further including:
a cashier terminal having a display screen for displaying a selected one of:
(a) a cashier screen having a plurality of indicia associated with predetermined functions in the ordering operation including:
cashing out an order, entering discount information for an order and changing an order; and
(b) a manager screen having a plurality of indicia with each of said indicia representing predetermined functions for selection including: cash control and written reports relating to customer self-ordering.

4. An apparatus, as claimed in claim 1, wherein:
said display information further includes fourth information and fifth information, said fourth information is a message that has only one choice to be made by the customer and said fifth information is displayed separately from said fourth information and is a message that requires the customer to make one selection from only two choices and wherein said fifth information is displayed immediately after the customer has complied with said message of said fourth information and in which said fourth information and said fifth information are displayed before said fist information, said second information and said third information.

5. An apparatus, as claimed in claim 1, wherein:
said customer terminal includes a touch screen wherein said solid food items are selected by the customer by touching indicia associated with said selected solid food items on said touch screen.

* * * * *